United States Patent
Schwartz et al.

(10) Patent No.: US 11,508,372 B1
(45) Date of Patent: Nov. 22, 2022

(54) NATURAL LANGUAGE INPUT ROUTING

(71) Applicant: Amazon Technologies, Inc., Seattle, WA (US)

(72) Inventors: Michael Schwartz, Seattle, WA (US); Joe Pemberton, Seattle, WA (US); Steven Mack Saunders, Bellevue, WA (US); Archit Jain, Seattle, WA (US); Alexander Go, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 16/904,853

(22) Filed: Jun. 18, 2020

(51) Int. Cl.
| | |
|---|---|
| G06F 40/30 | (2020.01) |
| G10L 15/22 | (2006.01) |
| G10L 15/18 | (2013.01) |
| G06N 20/20 | (2019.01) |
| G10L 15/06 | (2013.01) |
| G10L 15/183 | (2013.01) |
| G06F 40/35 | (2020.01) |
| G06F 40/295 | (2020.01) |
| G06F 16/332 | (2019.01) |

(52) U.S. Cl.
CPC .............. G10L 15/22 (2013.01); G06F 40/30 (2020.01); G06N 20/20 (2019.01); G10L 15/1815 (2013.01); G10L 15/1822 (2013.01); *G06F 16/3325* (2019.01); *G06F 40/295* (2020.01); *G06F 40/35* (2020.01); *G10L 15/183* (2013.01); *G10L 2015/0638* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,865,252 | B2* | 1/2018 | Bak | G10L 15/22 |
| 9,865,280 | B2* | 1/2018 | Sumner | G10L 25/48 |
| 10,229,680 | B1* | 3/2019 | Gillespie | G06F 40/295 |
| 10,431,214 | B2* | 10/2019 | Guo | G06F 40/237 |
| 10,482,182 | B1* | 11/2019 | Jankowski, Jr. | G10L 15/22 |
| 10,600,406 | B1* | 3/2020 | Shapiro | G10L 15/22 |
| 11,043,205 | B1* | 6/2021 | Su | G10L 15/183 |
| 2014/0163959 | A1* | 6/2014 | Hebert | G06F 16/3344 704/9 |
| 2014/0365502 | A1* | 12/2014 | Haggar | G06N 5/02 707/748 |
| 2015/0039292 | A1* | 2/2015 | Suleman | G06F 40/216 704/9 |
| 2016/0188565 | A1* | 6/2016 | Robichaud | G10L 15/1815 704/9 |
| 2019/0208388 | A1* | 7/2019 | Oldewurtel | H04L 67/12 |

* cited by examiner

Primary Examiner — Richard Z Zhu
(74) Attorney, Agent, or Firm — Pierce Atwood LLP

(57) ABSTRACT

Techniques for performing runtime ranking of skill components are described. A skill developer may generate a rule indicating a skill component is to be invoked at runtime when a natural language input corresponds to a specific context. At runtime, a virtual assistant system may implement a machine learned model to generate an initial ranking of skill components. Thereafter, the virtual assistant system may use skill component-specific rules to adjust the initial ranking, and this second ranking is used to determine which skill component to invoke to respond to the natural language input. Overtime, if a rule results in beneficial user experiences, the virtual assistant system may incorporate the rule into the machine learned model.

20 Claims, 14 Drawing Sheets

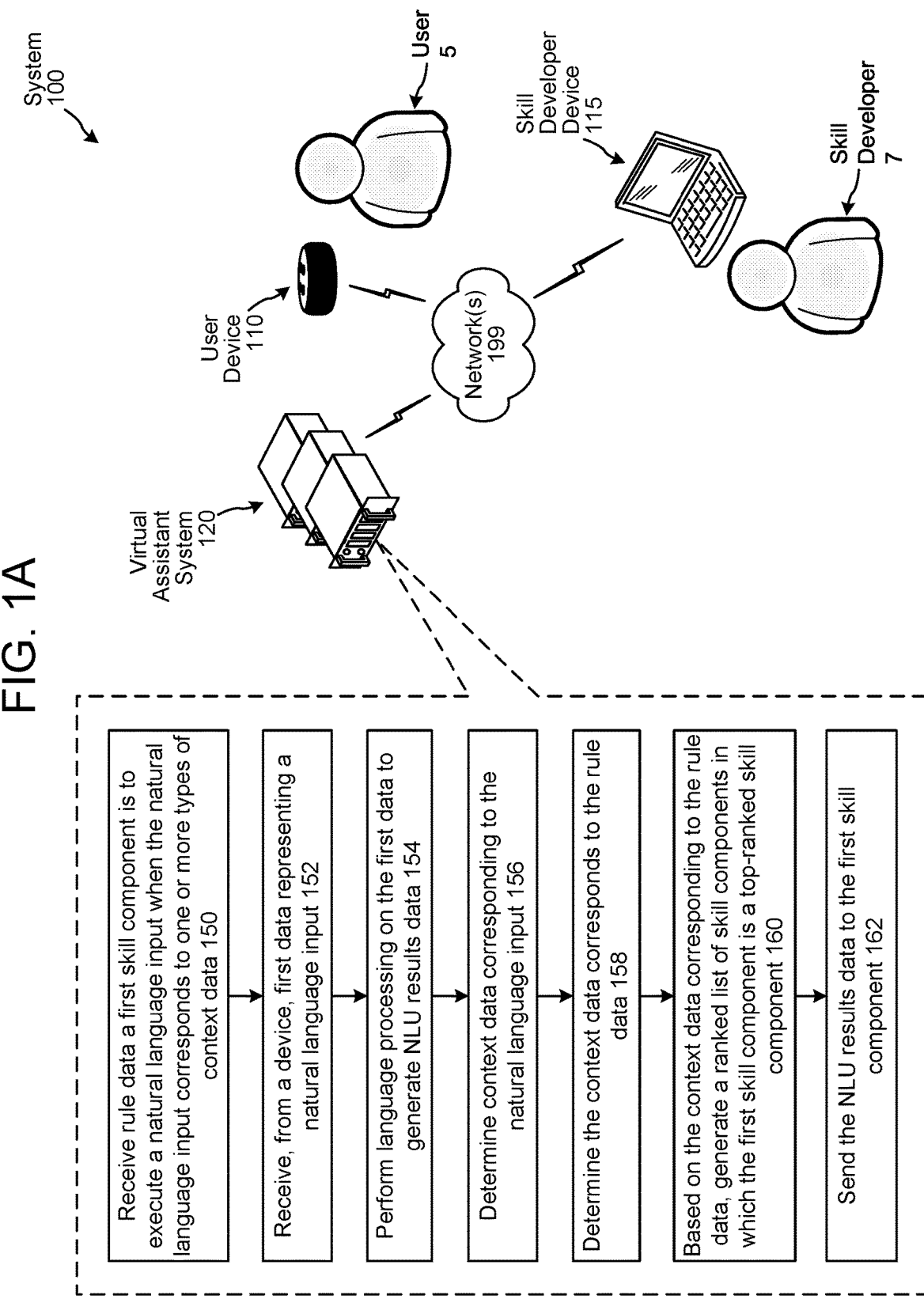

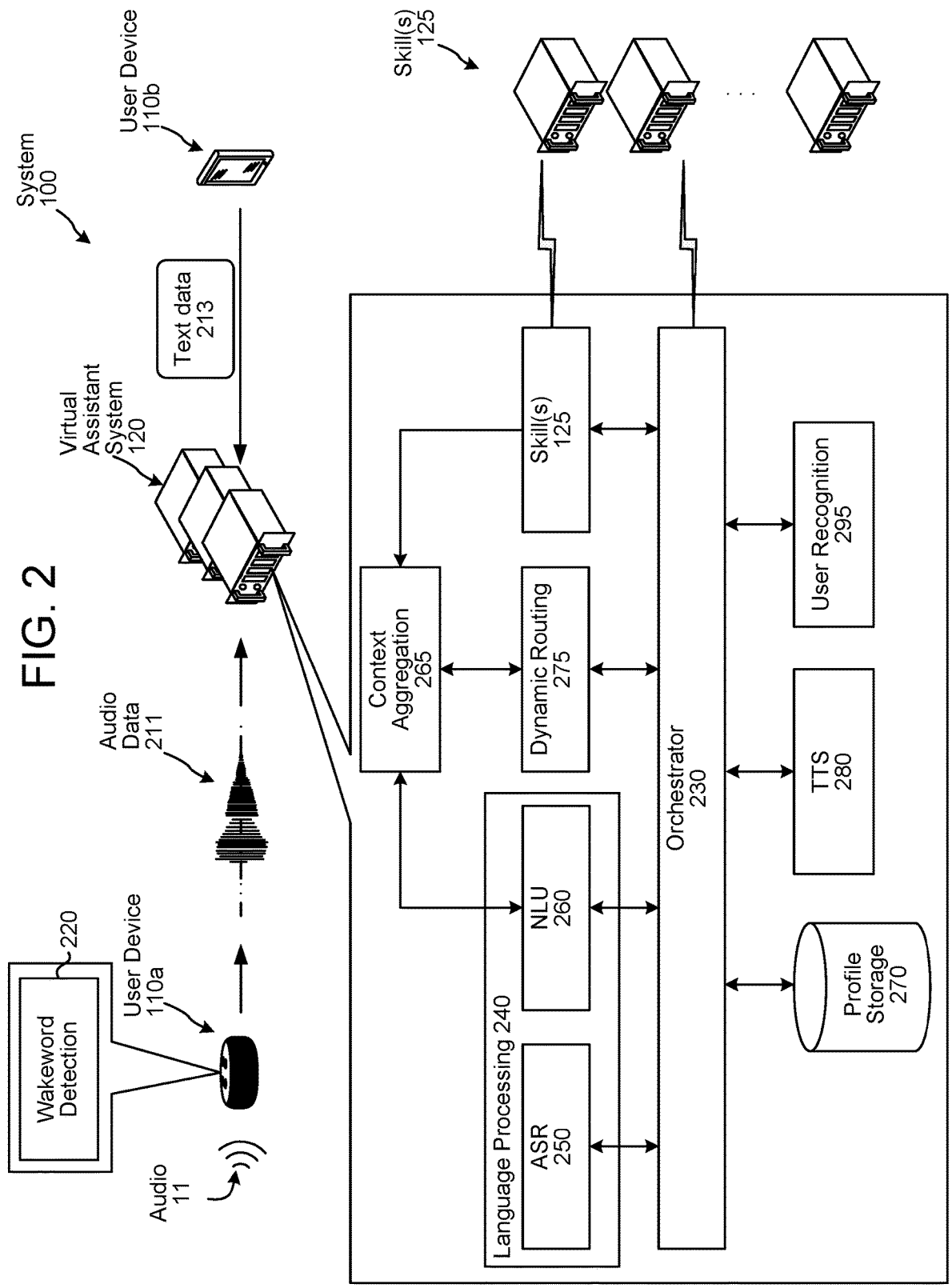

NATURAL LANGUAGE INPUT ROUTING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are a conceptual diagram illustrating a system configured to select a skill component, at runtime, based at least in part on a rule generated from context data provided by a skill component developer, as well as use the rule to train a machine learned model for selecting skill components at runtime, according to embodiments of the present disclosure.

FIG. 2 is a conceptual diagram of components of a virtual assistant system, according to embodiments of the present disclosure.

DETAILED DESCRIPTION

Figure 1B:
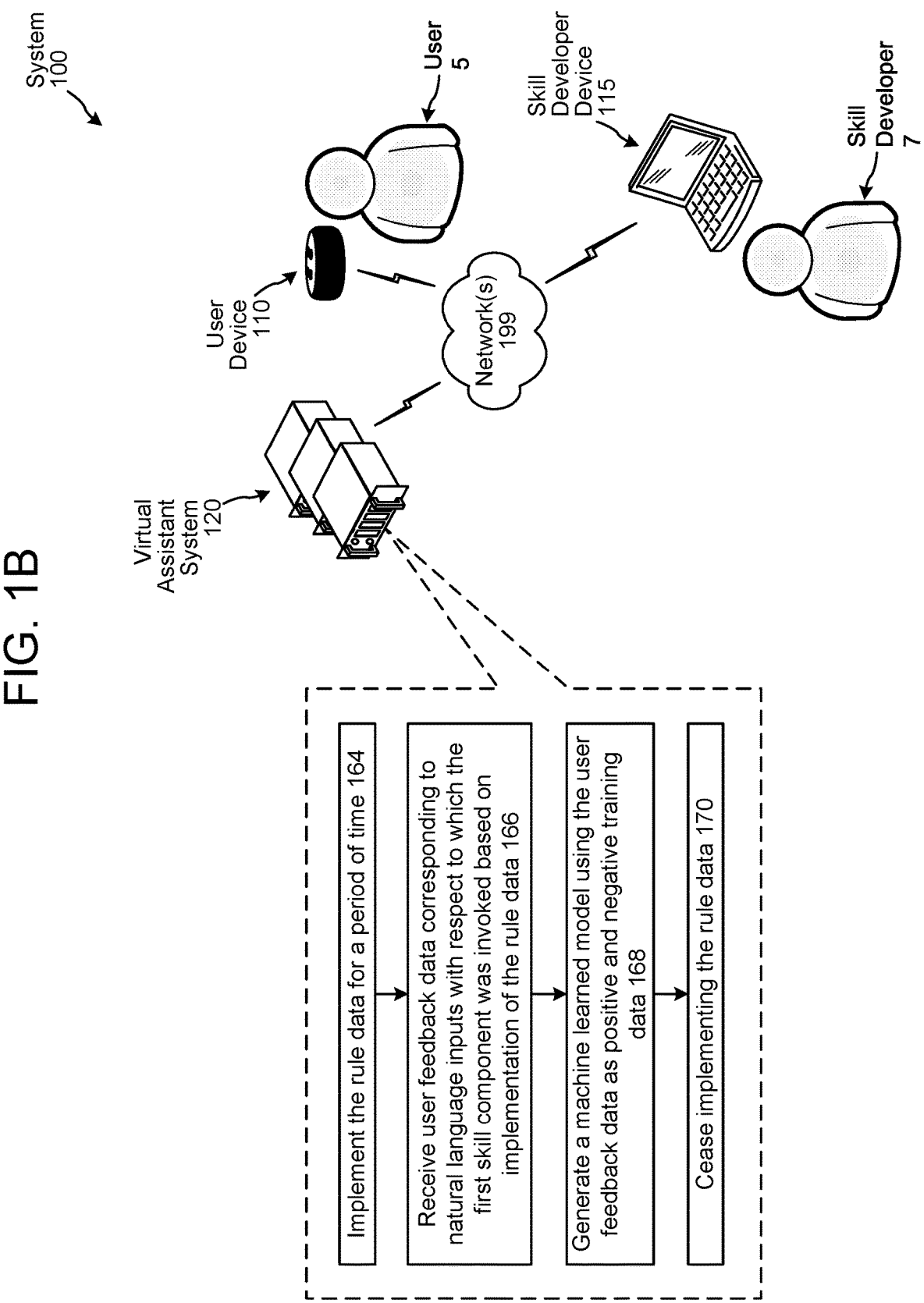

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may cause actions to be performed in response to natural language inputs (e.g., spoken inputs and text inputs, such as typed inputs). For example, for the natural language input "play Adele music," a system may output music sung by an artist named Adele. For further example, for the natural language input "turn on the lights," a system may turn on "smart" lights associated with a user's profile. In another example, for the natural language input "what is the weather," a system may output weather information for a geographic location corresponding to the user device that captured the natural language input. In the foregoing examples, actions correspond to the outputting of music, the turning on of "smart" lights, and the outputting of weather information. As such, as used herein, an "action" may refer to some result of a system's processing.

When a user provides a natural language input to a user device, the user device may generate a representation of the natural language input, and send the representation to a system (e.g., a cloud-based system) configured to perform language processing (as well as other processing described herein). For example, the system may perform ASR processing on audio data to generate ASR output data, and may perform NLU processing on ASR output data (or text corresponding to a typed natural language input) to generate NLU results data (e.g., representing a likely intent of the natural language input and corresponding slotted entities).

A system may implement (and/or be otherwise in communication with) one or more skill components. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like.

In at least some instances, a system may implement (and/or be otherwise in communication with) two or more skill components configured to process with respect to a same NLU intent (e.g., <OutputWeather>, <PlayMusic>, <PlayVideo>, <TurnOff> smart lights, <Lock> smart door lock, etc.), resulting in more than one skill component being capable of being invoked with respect to a single natural language input.

When a system receives a natural language input capable of being handled by multiple skill components, the system may generate a ranked list of skill components, for example, based on context data, skill component rating, and so on. Thereafter, the system may invoke the top ranked skill component to process in response to the natural language input (e.g., to cause an action, responsive to the natural language input, to be performed). If the top ranked skill component indicates it is unable to perform such processing, the system may thereafter invoke a next top ranked skill component (as represented in the ranked list of skill components) to process in response to the natural language input. The foregoing may be performed until the system invokes a skill component that is capable of processing in response to the natural language input. In other words, at least some systems may be configured to invoke skill components sequentially until a skill component, that can process in response to the natural language input, is invoked.

The present disclosure provides, among other things, techniques for improving runtime skill component selection (also known as skill component arbitration) in a manner that invokes skill components based on current context. In at least some embodiments, rules (implemented as rule data) may be integrated with one or more machine learned models to determine, at runtime, which skill component is an appropriate skill component to invoke for a given natural language input. As used herein, a "rule" may refer to data, generated from skill developer-provided information, and used by a system (or a component thereof) to make a binary (e.g., yes/no, true/false, etc.) determination, based on context data, as to whether a skill component should be invoked.

A skill component developer (e.g., a user of the system that provides the system with data for creating or otherwise configuring a skill component) may provide the system with data indicating the skill component developer's skill component should be invoked when a natural language input corresponds to one or more certain types of context data (e.g., when the natural language input is captured by a user device of a certain type or having certain characteristics; when a user device, that captured the natural language input, is in a particular state when the natural language input is captured; when the natural language input is captured during a certain time of day; where the user device, that captured the natural language input, is located in a particular geographic location; etc.). The system may generate a rule based on such data. At runtime, the system may use the machine learned model(s) and the rule of a skill component, to determine if the skill component is to be invoked to process in response to a natural language input.

While the present disclosure describes a skill developer providing rule data indicating when a skill component should be invoked, the present disclosure is not limited thereto. For example, in at least some instances, an end user (illustrated as user 5 in the FIGS.) may provide such rule data. Thus, it will be appreciated that an end user may have at least some control over how natural language inputs are interpreted based on context data.

Eventually, the system may determine a skill component's rule resulted in a significant number of beneficial user experiences. In other words, the system may determine the rule resulted in the skill component being invoked when users actually intended for the skill component to be invoked, and conversely that the rule did not result in the skill component being invoked when the skill component was not configured to process with respect to the corresponding natural language input. After such determination is made, the system may use the rule to retrain the machine learned model(s) (e.g., generate a new machine learned model(s) As a result, the retrained machine learned model(s) may be capable of making decisions based on the rule parameters, and the system no longer needs to separately implement the rule.

The teachings herein improve the user experience by decreasing potential latency caused by invoking skill components sequentially until a skill component, configured to process in response to the natural language input, is invoked. The teachings herein also improve the user experience by decreasing the likelihood that a system will invoke a skill component not intended by the user to be invoked.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A-1B show a system 100 configured to select a skill component, at runtime, based at least in part on rule data generated from context data provided by a skill component developer, as well as use the rule data to train a machine learned model for selecting skill components at runtime. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include a user device 110 (local to a user 5), a skill developer device 115 (local to a skill developer 7), and a virtual assistant system 120 connected across one or more networks 199. The network(s) 199 may include a local or private network or may include a wide network such as the Internet. While the user 5 is illustrated as being a human, other types of users (e.g., computing systems) may exist.

Referring to FIG. 1A, the skill developer 7 may provide, to the skill developer device 115, an input (e.g., typed or spoken input) corresponding to one or more specific types of context. Specifically, the input may represent a first skill component, with respect to which the skill developer is authorized to configure, should be invoked to process in response to natural language inputs corresponding to the one or more specific types of context. For example, such a skill developer input may represent a first skill component should be invoked when a natural language input is received from a user device including (or otherwise associated with) a display. For further example, such a skill developer input may represent a first skill component should be invoked when a natural language input is received from a user device experiencing a specific device state (e.g., is outputting audio, such as music, when the natural language input is captured; is outputting multimedia content (a combination of audio and video) when the natural language input is captured; etc.); when the user device is at a global positioning system (GPS) location corresponding to a particular geographic location (e.g., a particular continent, country, state, etc.); when a user profile includes location information corresponding to a particular geographic location; when a user profile indicates the user speaks a particular language; etc. For further example, the skill developer input may represent a category of skill components (e.g., private skill components, skill components authored using a particular schema, skill components corresponding to a particular domain, etc.) should be ranked at runtime when the natural language input corresponds to particular context data. In another example, the skill developer input may represent an NLU hypothesis (output by an NLU component at runtime) should be rewritten to a different NLU hypothesis when the natural language input corresponds to particular context data. The foregoing examples are merely illustrative, and other examples (both described herein and not herein described) are possible. The skill developer device 115 may send rule data, representing the one or more types of context, to the virtual assistant system 120 via the network(s) 199. The virtual assistant system 120 may receive (150) the rule data representing the first skill component is to execute a natural language input when the natural language input corresponds to one or more types of context data. For example, the virtual assistant system 120 may identify a first skill component identifier associated with the skill developer device 115 (or represented in the received first data), and may associate the rule data with the first skill component identifier. In at least some embodiments, the rule may correspond to a category of skill components (e.g., private skill components, skill components authored using a particular schema, skill components corresponding to a particular domain, etc.), rather than a single skill component identifier. Moreover, in at least some embodiments, the rule data may represent an NLU hypothesis (output by an NLU component) is to be switched to a different NLU hypothesis prior to calling a skill component to execute at runtime.

Sometime after receiving the rule data, the virtual assistant system 120 may receive (152), from the user device 110 via the network(s) 199, first data representing a natural language input of the user 5. The virtual assistant system 120 may perform (154) language processing on the first data to generate NLU results data (described in detail herein below).

The virtual assistant system 120 may determine (156) context data corresponding to the natural language input. For example, the context data may represent a type of the user device 110, characteristics (e.g., input/output characteristics) of the user device 110, a state of the user device 110 when the natural language input was captured (e.g., whether the user device 110 was outputting audio such as music, whether the user device 110 was output video, etc.), a time of day when the natural language input was captured; a geographic location of the user device 110, etc. It will be appreciated that the foregoing context data is merely illustrative, and that other types of context data (both described herein and not herein described) are possible.

Sometime after performing language processing on the first data, the virtual assistant system 120 may determine (158) the context data corresponds to the rule data. For example, the virtual assistant system 120 may determine rule data and context data both represent a particular device type and a particular NLU intent. For further example, the virtual assistant system 120 may determine the rule data and the context data both represent a particular time of day and a particular geographic location. In another example, the virtual assistant system 120 may determine the rule data and the context data both represent audio as being output when a natural language input is/was received. Other examples are possible.

Based on the context data corresponding to the rule data, the virtual assistant system 120 may generate (160) a ranked list of skill components (and more particularly skill component identifiers) in which the first skill component (and more particular first skill component identifier corresponding to the rule data) is a top-ranked skill component (more particularly a top-ranked skill component identifier). The skill component may be the top-ranked skill component based on the rule data (to which the skill component is associated) corresponding to the context data corresponding to the natural language input.

Thereafter, the virtual assistant system 120 may send (162) the NLU results data to the first skill component, thereby enabling the first skill component to process in response to the natural language input. For example, after determining the context data corresponds to the rule data, the virtual assistant system 120 may determine the rule data is associated with the first skill component's identifier and, based thereon, send the NLU results data to the first skill component. It will be appreciated that the foregoing processing effectively selects (or arbitrates) the first skill component to process based on the rule data corresponding to the context data associated with the natural language input.

The virtual assistant system 120 may implement (164) the rule data for a period of time with respect to natural language inputs of a plurality of users of the virtual assistant system 120. For example, the virtual assistant system 120 may perform skill selection, using the rule data, for a period of time with respect to 10% of natural language inputs received by the virtual assistant system 120.

During the period of time, the virtual assistant system 120 may receive (166) user feedback data corresponding to natural language inputs with respect to which the first skill component was invoked based on implementation of the rule data. The user feedback data may at least partially correspond to positive user feedback indicating invocation of the first skill component (based on the rule data) was beneficial from the user's perspective. The user feedback data may additionally or alternatively at least partially correspond to negative user feedback indicating invocation of the first skill component (based on the rule data) was not beneficial from the user's perspective.

After the period of time has elapsed, the virtual assistant system 120 may generate (168) a machine learned model using the user feedback data as positive and negative training data. For example, the virtual assistant system 120 may determine at least one instance when selection of the first skill component (based on the rule data) resulted in positive user feedback data, and may also determine at least one instance when selection of the first skill component (based on the rule data) resulted in negative user feedback data. Moreover, the virtual assistant system 120 may determine context data corresponding to the natural language inputs corresponding to the positive and negative user feedback data. The virtual assistant system 120 may use the natural language input and associated context data, corresponding to the positive user feedback data, as positive training data for purposes of training the machine learned model. Moreover, the virtual assistant system 120 may use the natural language input and associated context data, corresponding to the negative user feedback data, as negative training data for purposes of training the machine learned model. Such may produce a machine learned model that promotes selection of the first skill component when a future natural language input corresponds to the positive training data, and discourages selection of the first skill component when a future natural language input corresponds to the negative training data.

Once the virtual assistant system 120 generates the machine learned model (which is capable of making decisions based on the rule data), the virtual assistant system 120 may no longer need to implement the rule data. As a result, once the virtual assistant system 120 generates the machine learned model, the virtual assistant system 120 may cease (170) implementing the rule data. In at least some embodiments, the virtual assistant system 120 may cease implementation of the rule data by associating the rule data with a flag (or other indicator) that deprecates the rule data (i.e., the flag indicates the rule data should no longer being used to generate a ranked list. In at least some embodiments, after the rule data is deprecated, the virtual assistant system 120 may nonetheless still track how often the rule data corresponds to context data of a natural language input. In at least some embodiments, once the virtual assistant system 120 generates the machine learned model, the virtual assistant system 120 may delate the rule data from storage.

The system 100 may operate using various components as illustrated in FIG. 2. The various components may be located on a same or different physical devices. Communication between various components may occur directly or across a network(s) 199.

An audio capture component(s), such as a microphone or array of microphones of a user device 110*a*, captures audio 11. The user device 110*a* processes audio data, representing the audio 11, to determine whether speech is detected. The user device 110*a* may use various techniques to determine whether audio data includes speech. In some examples, the user device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110*a* may implement a limited classifier configured to distinguish speech from background noise. The classifier may be implemented by techniques such as linear classifiers, support vector machines, and decision trees. In still other examples, the user device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the user device 110*a* may use a wakeword detection component 220 to perform wakeword detection to determine when the user 5 intends to speak an input to the virtual assistant system 120. The user device 110*a* may be configured to detect various wakewords. In at least some examples, each wakeword may correspond to a different digital assistant. In at least some examples, a wakeword may correspond to a name of a digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the user device 110*a* may "wake" and begin transmitting audio data 211, representing the audio 11, to the virtual assistant system 120. The audio data 211 may include data corresponding to the detected wakeword, or the user device 110*a* may remove the portion of the audio corresponding to the detected wakeword prior to sending the audio data 211 to the virtual assistant system 120.

The virtual assistant system 120 may include an orchestrator component 230 configured to receive the audio data 211 from the user device 110*a*. The virtual assistant system 120 may include a language processing component 240 configured to perform language processing. As used herein, language processing may refer to NLU processing, or a combination of ASR processing and NLU processing.

The orchestrator component 230 may send the audio data 211 to an ASR component 250 that transcribes the audio data 211 into ASR results data including one or more ASR hypotheses. ASR results data may include one or more textual interpretations (corresponding to one or more ASR hypotheses), or may be configured in another manner, such as a token. Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In addition to a user device 110*a* receiving a spoken natural language input, a user device 110*b* may receive a typed natural language input. The user device 110*b* may generate text data 213 representing the typed natural language input, and may send the text data 213 to the virtual assistant system 120, wherein the text data 213 is received by the orchestrator component 230.

Figure 3:
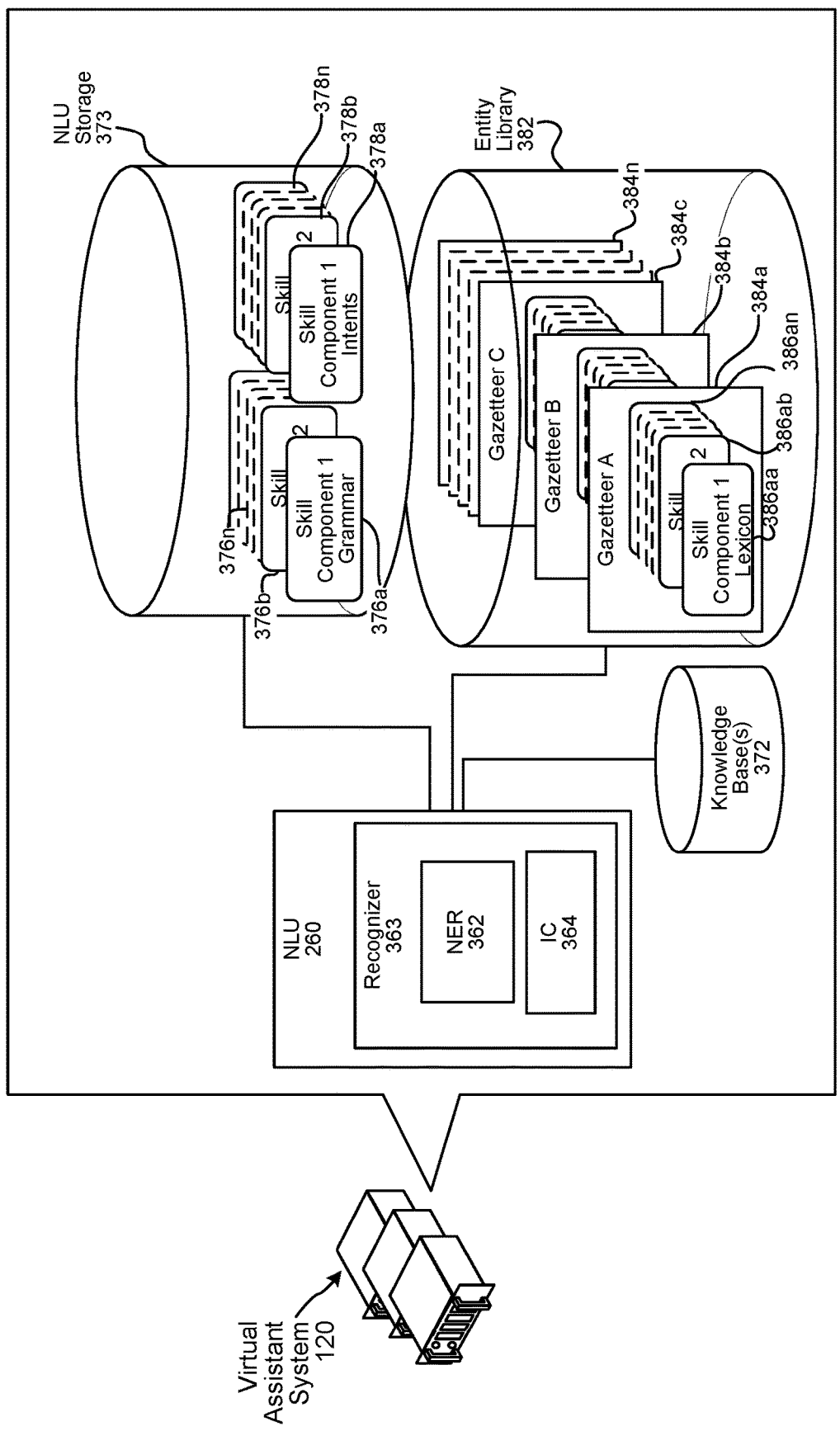
FIG. 3 is a conceptual diagram of how natural language processing may be, according to embodiments of the present disclosure.

The orchestrator component 230 may send the text data 213 or ASR results data output by the ASR component 250, depending on the type of natural language input, to a NLU component 260. FIG. 3 illustrates how the NLU component 260 may perform NLU processing.

The NLU component 260 may include one or more recognizers 363. In at least some embodiments, a recognizer 363 may be associated with a skill component 125 (e.g., the recognizer may be configured to interpret a natural language input to correspond to the skill component 125). In at least some other examples, a recognizer 363 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 363 may process in parallel, in series, partially in parallel, etc. For example, a recognizer corresponding to a first domain may process at least partially in parallel to a recognizer corresponding to a second domain. For further example, a recognizer corresponding to a first skill component may process at least partially in parallel to a recognizer corresponding to a second skill component.

The NLU component 260 may communicate with various storages. The NLU component 260 may communicate with an NLU storage 373, which includes skill component grammars (376a-376n), representing how natural language inputs may be formulated to invoke skill components 125, and skill component intents (378a-378n) representing intents supported by respective skill components 125.

Each recognizer 363 may be associated with a particular grammar 376, one or more particular intents 378, and a particular personalized lexicon 386 (stored in an entity library 382). A gazetteer 384 may include skill component-indexed lexical information associated with a particular user. For example, Gazetteer A (384a) may include skill component-indexed lexical information 386aa to 386an. A user's music skill component lexical information might include album titles, artist names, and song names, for example, whereas a user's contact list skill component lexical information might include the names of contacts. Since every user's music collection and contact list is presumably different, this personalized information may improve entity resolution.

Each recognizer 363 may include a NER component 362 that attempts to identify grammars and lexical information that may be used to construe meaning with respect to text data input therein. A NER component 362 identifies portions of text data that correspond to a named entity that may be recognizable by the virtual assistant system 120. A NER component 362 may also determine whether a word refers to an entity that is not explicitly mentioned in the text, for example "him," "her," "it" or other anaphora, exophora or the like.

A NER component 362 applies grammar models 376 and lexical information 386 associated with one or more skill components 125 to determine a mention of one or more entities in text data input therein. In this manner, a NER component 362 identifies "slots" (i.e., particular words in text data) that may be needed for later processing. A NER component 362 may also label each slot with a type (e.g., noun, place, city, artist name, song name, etc.).

Each grammar model 376 may include the names of entities (i.e., nouns) commonly found in natural language about a particular skill component 125 to which the grammar model 376 relates, whereas lexical information 386 may be personalized to the user identifier output by a user recognition component 295 for the natural language input. For example, a grammar model 376 associated with a shopping skill component may include a database of words commonly used when people discuss shopping.

A downstream process called named entity resolution actually links a portion of text data (identified by a NER component 362) to a specific entity known to the virtual assistant system 120. To perform named entity resolution, the NLU component 260 may use gazetteer information (384a-384n) stored in the entity library storage 382. The gazetteer information 384 may be used to match text data (identified by a NER component 362) with different entities, such as song titles, contact names, etc. Gazetteers may be linked to users (e.g., a particular gazetteer may be associated with a specific user's music collection), may be linked to certain skill components 125 (e.g., a shopping skill component, a music skill component, a video skill component, a communications skill component, etc.), or may be organized in another manner.

Each recognizer 363 may also include an IC component 364 that processes text data input thereto to determine an intent(s) of a skill component(s) 125 that potentially corresponds to the natural language input represented in the text data. An intent corresponds to an action to be performed that is responsive to the natural language input represented by the text data. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 378 associated with the skill component(s) 125 that is associated with the recognizer 363 implementing the IC component 364.

The intents identifiable by a specific IC component 364 may be linked to one or more skill component-specific grammar frameworks 376 with "slots" to be filled. Each slot of a grammar framework 376 corresponds to a portion of text data that a NER component 362 believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, a NER component 362 may identify words in text data as subject, object, verb, preposition, etc. based on grammar rules and/or models prior to recognizing named entities in the text data. An IC component 364 (implemented by the same recognizer 363) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in the text data the NER component 362 previously tagged as a grammatical object or object modifier with those identified in the lexicon 386.

A NER component 362 may perform semantic tagging, which is the labeling of a word or combination of words according to their type/semantic meaning. A NER component 362 may parse text data using heuristic grammar rules, or a model may be constructed using techniques such as hidden Markov models, maximum entropy models, log linear models, conditional random fields (CRF), and the like.

For example, a NER component 362, implemented by a music skill component or music domain recognizer 363, may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 may identify "Play" as a verb based on a word database associated with the music skill component or music domain, which an IC component 364 may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity).

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (in the knowledge base 372). For example, if the text data corresponds to "play songs by the rolling stones," after failing to determine an album name or song name called "songs" by "the rolling stones," the NER component 362 may search a music skill component vocabulary for the word "songs." In the alternative, generic words may be checked before the gazetteer information, or both may be tried, potentially producing two different results.

A recognizer 363 may tag text data to attribute meaning thereto. For example, a recognizer 363 may tag "play mother's little helper by the rolling stones" as: {skill component} Music, {intent} Play Music, {artist name} rolling stones, {media type} SONG, and {song title} mother's little helper. For further example, a recognizer 363 may tag "play songs by the rolling stones" as: {skill component} Music, {intent} Play Music, {artist name} rolling stones, and {media type} SONG.

As described above, more than one recognizer 363 may process with respect to text data representing a single natural language input. In such instances, each recognizer 363 may output at least one NLU hypothesis including an intent indicator (determined by an IC component 364 of the recognizer 363) and at least one tagged named entity (determined by a NER component 362 of the recognizer 363).

The NLU component 260 may include a shortlister component 410. The shortlister component 410 selects skill components that may execute in response to the natural language input. The shortlister component 410 thus limits downstream, more resource intensive NLU processes to being performed with respect to skill components 125 that are likely to execute in response to the natural language input.

Without a shortlister component 410, the NLU component 260 may process a given ASR hypothesis (or the text data 213 depending on the type of natural language input being processed) with respect to every skill component 125 of (or in communication with) the virtual assistant system 120, either in parallel, in series, or using some combination thereof. By implementing a shortlister component 410, the NLU component 260 may process a given ASR hypothesis (or the text data 213) with respect to only the skill components 125 that are likely to execute in response to the natural language input. This reduces total compute power and latency attributed to NLU processing.

The shortlister component 410 may include one or more trained models. The model(s) may be trained to recognize various forms of natural language inputs that may be received by the virtual assistant system 120. For example, during a training period a skill component 125 may provide the virtual assistant system 120 with training data representing sample natural language inputs that may be provided by a user to invoke the skill component 125. For example, for a ride sharing skill component may provide the virtual assistant system 120 with training data including text corresponding to "get me a cab to [location]," "get me a ride to [location]," "book me a cab to [location]," "book me a ride to [location]," etc. The one or more trained models, to be used by the shortlister component 410, may be trained using the training data to determine other potentially related natural language input structures that a user may try to use to invoke the particular skill component 125. During training, the virtual assistant system 120 may query the skill component 125 regarding whether the determined other natural language input structures are permissible, from the perspective of the skill component 125, to be used to invoke the skill component 125 at runtime. The alternate natural language input structures may be derived by one or more trained models during model training and/or may be based on natural language input structures provided by different skill components. The skill component 125 may also provide the virtual assistant system 120 with training data indicating grammar and annotations. The virtual assistant system 120 may use the training data representing the sample natural language inputs, the determined related natural language input(s), the grammar, and the annotations to train a model that indicates when a runtime natural language inputs is likely to be directed to/handled by a skill component. Each trained model of the shortlister component 410 may be trained with respect to a different skill component 125. Alternatively, the shortlister component 410 may use one trained model per skill component 125 type, such as one trained model for weather skill components, one trained model for ride sharing skill components, etc.

The virtual assistant system 120 may use the sample natural language inputs provided by a skill component 125, and related sample natural language inputs determined during training, as binary examples to train a model associated with the skill component 125. The model associated with the particular skill component 125 may then be operated at runtime by the shortlister component 410. For example, some sample natural language inputs may be positive examples (e.g., natural language inputs that may be used to invoke the skill component 125). Other sample natural language inputs may be negative examples (e.g., natural language inputs that may not be used to invoke the skill component 125).

As described above, the shortlister component 410 may include a different trained model for each skill component 125, a different trained model for each skill component 125 category, or some other combination of trained model(s). For example, the shortlister component 410 may alternatively include a single model. The single model may include a portion trained with respect to characteristics (e.g., semantic characteristics) shared by all skill components 125. The single model may also include skill component 125-specific portions, with each skill component 125-specific portion being trained with respect to a different skill component 125. Implementing a single model with skill component 125-specific portions may result in less latency than implementing a different trained model for each skill component 125 because the single model with skill component 125-specific portions limits the number of characteristics processed on a per skill system 125 level.

The portion of the model, trained with respect to characteristics shared by more than one skill component 125, may be clustered based on skill component 125 type. For example, a first portion, of the portion trained with respect to multiple skill components 125, may be trained with respect to weather skill components 125; a second portion, of the portion trained with respect to multiple skill components 125, may be trained with respect to music skill components 125; a third portion, of the portion trained with respect to multiple skill components 125, may be trained with respect to travel skill components 125; etc.

Clustering may not be beneficial in every instance because clustering may cause the shortlister component 410 to output indications of only a portion of the skill components 125 that the natural language input may relate to. For example, a natural language input may correspond to "tell me about Tom Collins." If the model is clustered based on skill component 125 type, the shortlister component 410 may determine the natural language input corresponds to a recipe skill component 125 (e.g., a drink recipe) even though the natural language input may also correspond to an information skill component 125 (e.g., storing or otherwise having access to information about a person named Tom Collins).

Training the shortlister component 410 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 410 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skill components 125, only the recognizers 363 associated with those skill components 125 may process with respect to the natural language input. The selected recognizers 363 may process in parallel, in series, partially in parallel, etc. For example, if the shortlister component 410 determines a natural language input may relate to both a communications skill component 125 and a music skill component 125, a recognizer 363 associated with the communications skill component 125 may process in parallel, or partially in parallel, with a recognizer 363 associated with the music skill component 125 processing.

The shortlister component 410 may make binary determinations (e.g., yes or no) regarding which skill component(s) 125 corresponds to a natural language input. The shortlister component 410 may make such determinations using the one or more trained models described herein above. If the shortlister component 410 implements a single trained model for each skill component 125, the shortlister component 410 may simply run the models that are associated with enabled skill components 125 as indicated in a profile (e.g., stored in a profile storage 270 described in further detail below) associated with the user device 110 and/or user 5 that originated the natural language input.

The shortlister component 410 may generate shortlisted skill component data 415 representing one or more skill components 125 that may execute in response to the natural language input. The number of skill components 125 represented in the shortlisted skill component data 415 is configurable. In an example, the shortlisted skill component data 415 may indicate every skill component 125 of (or otherwise in communication with) the virtual assistant system 120 as well as contain an indication, for each skill component 125, representing whether the associated skill component 125 is likely capable of processing in response to the natural language input. In another example, instead of indicating every skill component 125, the shortlisted skill component data 415 may only indicate the skill components 125 that are likely capable of processing in response to the natural language input. In yet another example, the shortlister component 410 may implement thresholding such that the shortlisted skill component data 415 may indicate no more than a maximum number of skill components 125 that may process in response to the natural language input.

In at least some embodiments, the shortlister component 410 may generate a score representing how likely a skill component 125 is likely to processing in response to a natural language input. In such embodiments, the shortlisted skill component data 415 may only include identifiers of skill components 125 associated with scores meeting or exceeding a threshold score.

In the situation where the ASR component 250 outputs ASR output data including more than one interpretation of a natural language input, the shortlister component 410 may output different shortlisted skill component data 415 for each interpretation. Alternatively, the shortlister component 410 may output a single shortlisted skill component data 415 representing the skill components 125 corresponding to the different interpretations.

As indicated above, the shortlister component 410 may implement thresholding such that the shortlisted skill component data 415 may indicate no more than a threshold number of skill components 125 (e.g., may include no more than a threshold number of skill component 125 identifiers). If the ASR component 250 outputs ASR output data including more than one interpretation of a natural language input, the shortlisted skill component data 415 may indicate no more than a threshold number of skill components 125 irrespective of the number of interpretations output by the ASR component 250. Alternatively or in addition, the shortlisted skill component data 415 may indicate no more than a threshold number of skill components 125 for each interpretation (e.g., indicating no more than five skill components 125 for a first interpretation, no more than five skill components 125 for a second interpretation, etc.).

In addition to making a binary determination regarding whether a skill component 125 may process in response to a natural language input, the shortlister component 410 may generate scores representing likelihoods that skill components 125 may process in response to the natural language inputs. If the shortlister component 410 implements a different trained model for each skill component 125, the shortlister component 410 may generate a different confidence score for each skill component 125-specific trained model that is run by the shortlister component 410. For example, if the shortlister component 410 runs the models of every skill component 125 of (or otherwise in communication with) the virtual assistant system 120, the shortlister component 410 may generate a respective confidence score for each skill component 125 of (or otherwise in communication with) the virtual assistant system 120. For further example, if the shortlister component 410 only runs models specific to skill components 125 that are indicated as enabled in a profile associated with the user device 110 and/or user 5 (as stored in the profile storage 270), the shortlister component 410 may only generate a respective confidence score for each enabled skill component 125. For further examine, if the shortlister component 410 implements a single trained model with skill component 125-specific portions, the shortlister component 410 generate a respective confidence score for each skill component 125 who's specifically trained portion is run. The shortlister component 410 may perform matrix vector modification to obtain confidence scores for skill components 125.

An example of shortlisted skill component data 415 including confidence scores may be represented as:

Search skill component, 0.67
Recipe skill component, 0.62
Information skill component, 0.57

As indicated, the confidence scores output by the shortlister component 410 may be numeric values. The confidence scores output by the shortlister component 410 may alternatively be binned values (e.g., high, medium, low).

The shortlister component 410 may consider other data 420 when determining which skill components 125 may process in response to a natural language input. The other data 420 may be character embedded prior to being input to the shortlister component 410. The other data 420 may alternatively be embedded using other techniques.

The other data 420 may include usage history data associated with the user device 110 and/or user 5. For example, a confidence score of a skill component 125 may be increased if natural language inputs captured by the user device 110 and/or originating from the user 5 routinely relate to the skill component 125. Conversely, a confidence score of a skill component 125 may be decreased if natural language inputs captured by the user device 110 and/or originated from the user 5 rarely relate to the skill component 125.

The other data 420 may indicate the skill components 125 that are enabled with respect to the user device 110 and/or user 5 (e.g., as represented in the profile storage 270). The shortlister component 410 may use such data to determine which skill component 125-specific trained models to run. That is, the shortlister component 410 may determine to only run the trained models associated with enabled skill components 125. The shortlister component 410 may alternatively use such data to alter skill component confidence scores represented in the shortlisted skill component data 415.

As an example, considering two skill components 125, one enabled and another unenabled, the shortlister component 410 may run a first model (or model portion) specific to the unenabled skill component as well as a second model (or model portion) specific to the enabled skill component. The shortlister component 410 may initially determine a confidence score of 0.60 for each of the unenabled skill component and the enabled skill component. The shortlister component 410 may then alter those confidence scores based on which skill component is enabled. For example, the shortlister component 410 may increase the confidence score associated with the enabled skill component and/or decrease the confidence score associated with the unenabled skill component.

A user 5 may provide the virtual assistant system 120 with indications of which skill components 125 are enabled (e.g., authorized to execute using data associated with the user 5). Such indications may be stored in the profile storage 270. The shortlister component 410 may determine whether profile data associated with the user 5 and/or user device 110 that originated the natural language input includes indications of enabled skill components 125.

The other data 420 may indicate a type of the user device 110. The type of the user device 110 may indicate the input/output capabilities of the user device 110. For example, a user device 110 may include a display, may be headless (e.g., displayless), may be mobile or stationary, may include audio playback capabilities, may include a camera, etc. The shortlister component 410 may use such other data 420 to determine which skill component 125-specific trained models (or portions of a model) to run. For example, if the user device 110 corresponds to a displayless type of user device, the shortlister component 410 may determine not to run trained models (or portions of a model) specific to skill components 125 that output video data. The shortlister component 410 may alternatively use such other data 420 to alter skill component confidence scores represented in the shortlisted skill component data 415.

As an example, considering two skill components 125, one that outputs audio data and another that outputs video data, the shortlister component 410 may run a first model (or first portion of a model) specific to the skill component 125 that generates audio data as well as a second model (or second portion of a model) specific to the skill component 125 that generates video data. The shortlister component 410 may initially determine a confidence score of 0.60 for each of the skill components 125. The shortlister component 410 may then alter the original confidence scores based on the type of the user device 110. For example, if the user device 110 is a displayless device, the shortlister component 410 may increase the confidence score associated with the skill component 125 that generates audio data and/or decrease the confidence score associated with the skill component 125 that generates video data.

The type of user device data represented in the other data 420 may represent output capabilities of the user device 110 to be used to output content to the user 5, which may not necessarily be the user device 110 that captured the natural language input. For example, a displayless user device 110 may receive a natural language input corresponding to "play Game of Thrones". The virtual assistant system 120 may determine a smart TV, or other user device including or otherwise associated with a display, is to be used to output multimedia content (e.g., audio and video) corresponding to the title "Game of Thrones".

The other data 420 may include data indicating the user device 110's speed, location, or other mobility data. For example, the user device 110 may correspond to a vehicle including a display. If the vehicle is moving, the shortlister component 410 may decrease the confidence score associated with a skill component 125 that generates video data as it may be undesirable to output video content to the user 5 while in a moving vehicle. The vehicle may output data to the virtual assistant system 120 indicating when the vehicle is in motion.

The other data 420 may include data indicating a currently invoked skill component 125 (e.g., a skill component 125 that is being used to output content to the user 5 when the user device 110 receives the natural language input). For example, the user 5 may speak a first (e.g., a previous) input causing the virtual assistant system 120 to invoke a music skill component 125 to output music to the user 5. As the music is being output to the user 5, the virtual assistant system 120 may receive a second (e.g., a current) natural languate input. The shortlister component 410 may use such other data 420 to alter skill component confidence scores represented in the shortlisted skill component data 415. For example, the shortlister component 410 may run a first model (or a first portion of model) specific to a first skill component 125 as well as a second model (or second portion of a model) specific to a second skill component 125. The shortlister component 410 may initially determine a confidence score of 0.60 for each of the skill components 125. The shortlister component 410 may then alter the original confidence scores based on the first skill component 125 being invoked to output content while the current natural language input was received. Based on the first skill component 125 being invoked, the shortlister component 410 may increase the confidence score associated with the first skill component 125 and/or decrease the confidence score associated with the second skill component 125.

The thresholding implemented with respect to the shortlisted skill component data 415 and the different types of other data 420 considered by the shortlister component 410 are configurable. For example, the shortlister component 410 may update confidence scores as more other data 420 is considered.

The shortlister component 410 may cause the NLU component 260 to invoke only a subset of the recognizers 363 associated with skill components 125 represented in the shortlisted skill component 415 as being likely to process in response to the natural language input. If the shortlister component 410 generates the shortlisted skill component data 415 to include confidence scores, the shortlister component 410 may cause the NLU component 260 to invoke only recognizers 363 associated with skill components 125 associated with confidence scores satisfying (e.g., meeting or exceeding) a condition (e.g., a threshold confidence score).

Figure 4:
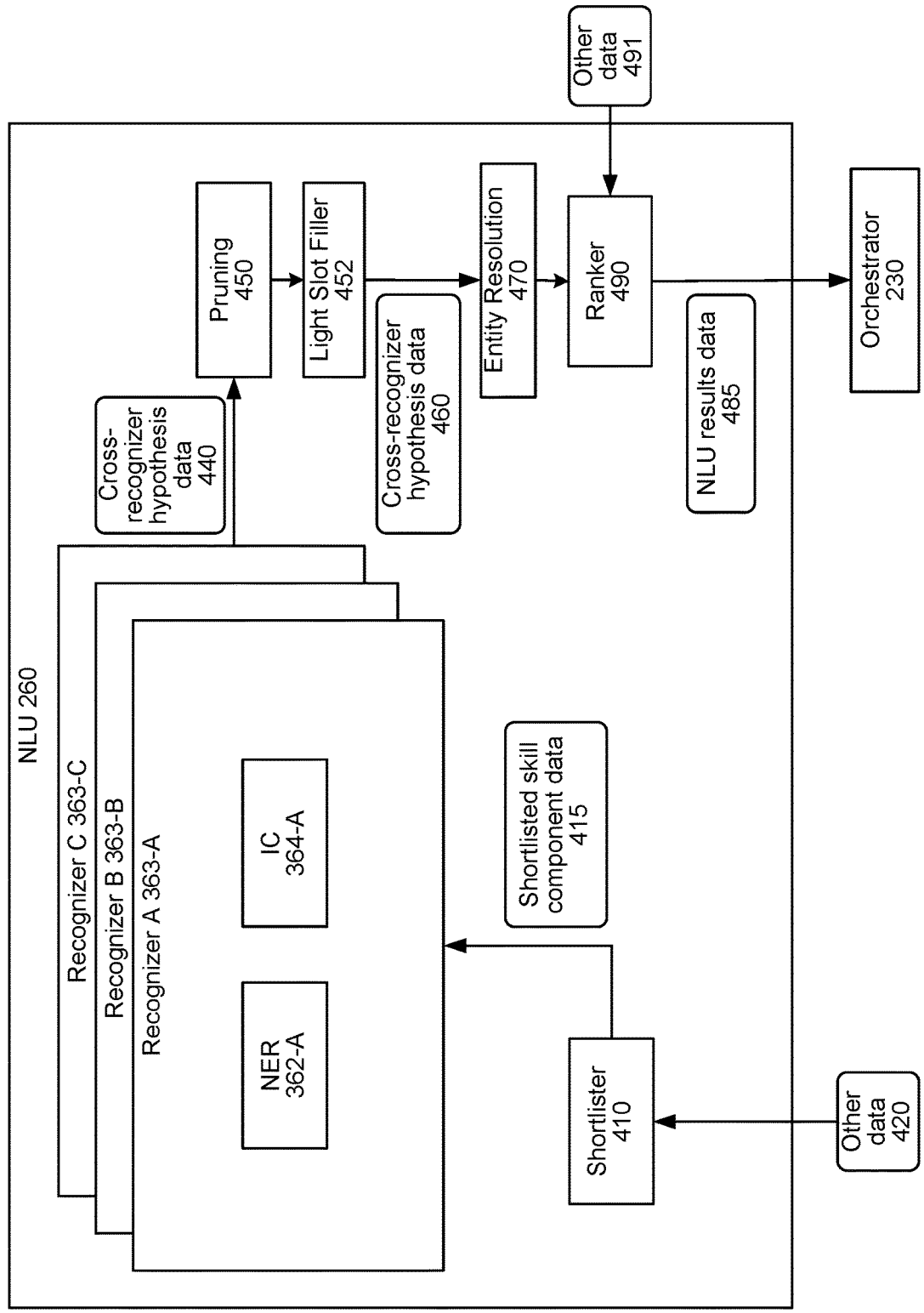
FIG. 4 is a conceptual diagram of how natural language processing may be performed, according to embodiments of the present disclosure.

The NLU component 260 may compile NLU hypotheses, output by multiple recognizers 363, into cross-recognizer hypothesis data 440 (illustrated in FIG. 4). Each NLU hypothesis may be associated with a respective score indicating a likelihood that the NLU hypothesis corresponds to the domain, one or more skill components 125, etc. associated with the recognizer 363 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <PlayVideo> VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 260 may send the cross-recognizer hypothesis data 440 to a pruning component 450, which sorts the NLU hypotheses, represented in the cross-recognizer hypothesis data 440, according to their respective scores. The pruning component 450 may then perform score thresholding with respect to the cross-recognizer hypothesis data 440. For example, the pruning component 450 may select NLU hypotheses, represented in the cross-recognizer hypothesis data 440, associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 260 may include a light slot filler component 452 that takes text from slots, represented in the NLU hypotheses output by the pruning component 450, and alters it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill component 125, domain, etc. to which a NLU hypothesis relates. For example, for a travel skill component 125-specific NLU hypothesis, the entity resolution component 470 may transform text corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text. Referring to the example natural language input "play songs by the stones," the entity resolution component 470 may reference a personal music catalog, Amazon Music account, a user profile, or the like (for example stored in the profile storage 270). The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill component 125 to perform an action responsive to the natural language input. The NLU component 260 may include multiple entity resolution components 470 that are each specific to one or more different skill components 125, domains, etc.

The NLU component 260 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also consider other data 491. The other data 491 may include a variety of data.

For example, the other data 491 indicate skill component 125 rating or popularity. For example, if a skill component 125 has a high rating, the ranker component 490 may increase the score of a NLU hypothesis associated with that skill component 125, and vice versa.

The other data 491 may indicate skill components 125 that have been enabled by the user 5. For example, the ranker component 490 may assign higher scores to NLU hypotheses associated with enabled skill components 125 than NLU hypotheses associated with skill components 125 that have not been enabled by the user 5.

The other data 491 indicate system usage history (e.g., specific to the user 5), such as if the user 5 regularly invokes a particular skill component 125 or does so at particular times of day. The other data 491 may indicate a present date, a present time, location of the user device 110, weather data, a type of the device 110, a user identifier of the user 5, context data, as well as other data. For example, the ranker component 490 may consider when any particular skill component 125 is currently active with respect to the present user 5 and/or user device 110 (e.g., music being output by the skill component 125 when the current natural language input is received).

The ranker component 490 may output NLU results data 685 including one or more NLU hypotheses. The NLU component 260 may send the NLU results data 485 to the orchestrator component 230.

As described above, the virtual assistant system 120 may perform speech processing using two different components (e.g., the ASR component 250 and the NLU component 260). One skilled in the art will appreciate that the virtual assistant system 120, in at least some embodiments, may implement a SLU component configured to process audio data 211 to generate NLU results data 485.

In some examples, the SLU component may be equivalent to a combination of the ASR component 250 and the NLU component 260. Yet, the SLU component may process audio data 211 and directly generate the NLU results data 485, without an intermediate step of generating ASR output data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive a desired action. The SLU component may output a most likely NLU hypothesis, or multiple NLU hypotheses associated with respective confidence scores or other scores (such as probability scores, etc.).

Referring again to FIG. 2 and as described above, the virtual assistant system 120 may include or otherwise communicate with one or more skill components 125. A skill component 125 may be configured to execute with respect to NLU results data 485. For example, for NLU results data 485 including a <GetWeather> intent, the virtual assistant system 120 (and more particularly the orchestrator component 230) may invoke a weather skill component 125 to determine and output weather information for a geographic location represented in a user profile or corresponding to a location of the user device 110 that captured the corresponding natural language input. For further example, for NLU results data including a <BookRide> intent, the virtual assistant system 120 (and more particularly the orchestrator component 230) may invoke a taxi skill component 125 may book a requested ride. In another example, for NLU results data including a <BuyPizza> intent, the virtual assistant system 120 (and more particularly the orchestrator component 230) may invoke a restaurant skill component 125 may place an order for a pizza. A skill component 125 may operate in conjunction between the virtual assistant system 120 and other devices, such as the user device 110, restaurant electronic ordering systems, taxi electronic booking systems, etc. in order to complete certain functions. Inputs to a skill component 125 may come from speech processing interactions or through other interactions or input sources.

A skill component 125 may be associated with a domain, a non-limiting list of which includes a smart home domain, a music domain, a video domain, a weather domain, a communications domain, a flash briefing domain, a shopping domain, and a custom domain.

The virtual assistant system 120 may include a TTS component 280 that generates audio data (e.g., synthesized speech) from text data using one or more different methods. Text data input to the TTS component 280 may come from a skill component 125, the orchestrator component 230, or another component of the virtual assistant system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The virtual assistant system 120 may include a user recognition component 295. In at least some examples, the user recognition component 295 may be implemented as a skill component 125.

The user recognition component 295 may recognize one or more users using various data. The user recognition component 295 may take as input the audio data 211 and/or the text data 213. The user recognition component 295 may perform user recognition processing by comparing speech characteristics, in the audio data 211, to stored speech characteristics of users. The user recognition component 295 may additionally or alternatively perform user recognition processing by comparing biometric data (e.g., fingerprint data, iris data, retina data, etc.), received by the virtual assistant system 120 in correlation with a current natural language input, to stored biometric data of users. The user recognition component 295 may additionally or alternatively perform user recognition processing by comparing image data (e.g., including a representation of at least a feature of the user 5), received by the virtual assistant system 120 in correlation with a current natural language input, with stored image data including representations of features of different users of the user device 110. The user recognition component 295 may perform other or additional user recognition processes, including those known in the art. For a particular natural language input, the user recognition component 295 may perform processing with respect to stored data of users associated with the user device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition processing.

The user recognition component 295 may output a single user identifier corresponding to the most likely user that originated the natural language input. Alternatively, the user recognition component 295 may output multiple user identifiers with respective values representing likelihoods of respective users originating the natural language input. The output of the user recognition component 295 may be used to inform NLU processing, processing performed by a skill component(s) 125, as well as processing performed by other components of the virtual assistant system 120 and/or other systems.

The virtual assistant system 120 may include profile storage 270. The profile storage 270 may include a variety of data related to individual users, groups of users, devices, etc. that interact with the virtual assistant system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data. Data of a profile may additionally or alternatively include data representing a preferred assistant to respond to natural language inputs corresponding to the profile.

The profile storage 270 may include one or more user profiles. Each user profile may be associated with a different user identifier. Each user profile may include various user identifying data. Each user profile may also include preferences of the user. Each user profile may include one or more device identifiers, representing one or more devices registered to the user. Each user profile may include identifiers of skill components 125 that the user has enabled. When a user enables a skill component 125, the user is providing the virtual assistant system 120 with permission to allow the skill component 125 to execute with respect to the user's natural language inputs. If a user does not enable a skill component 125, the virtual assistant system 120 may not invoke the skill component 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying data. A device profile may also include one or more user identifiers, corresponding to one or more user profiles associated with the device profile. For example, a household device's profile may include the user identifiers of users of the household.

Figure 5:
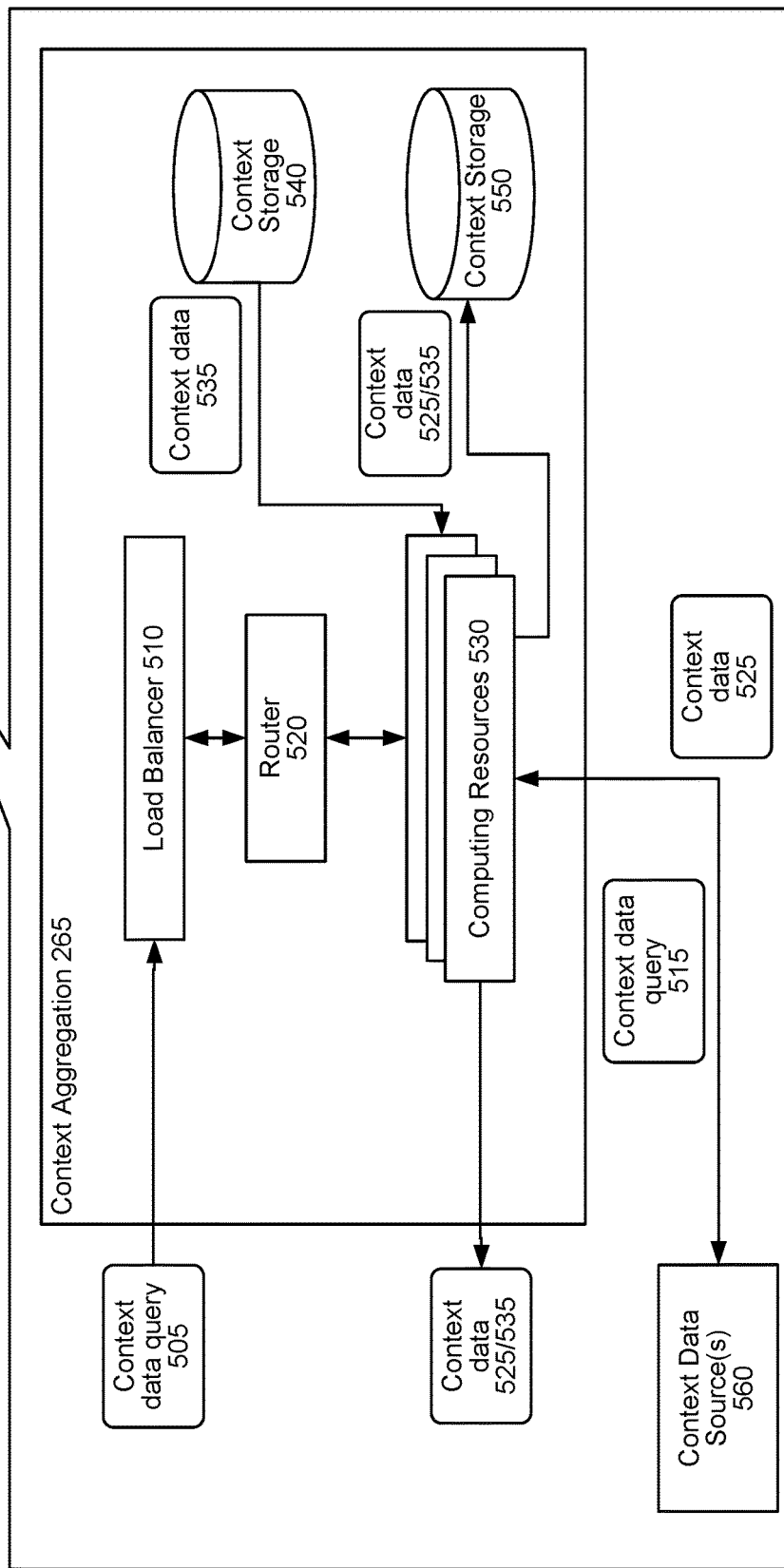
FIG. 5 is a conceptual diagram illustrating components for aggregating context data in response to a query for context data, according to embodiments of the present disclosure.

The virtual assistant system 120 may include a context aggregation component 265 that aggregates context data from various sources. FIG. 5 illustrates how the context aggregation component 265 may process a context data query 505 requesting context data corresponding to a particular natural language input. The context data query 505 may be sent to a load balancer 510. The load balancer 510 may assign the context data query 505 to one or more computing resources 530 based on a present load of the computing resources 530.

The context aggregation component 265 may receive multiple context data queries associated with the same natural language input. Moreover, more than one of these context data queries may be received by the context aggregation component 265 between a time when one or more computing resources 530 are called to process with respect to one of the context data queries and when the one or more computing resources 530 outputs the requested context data. The context aggregation component 265 may include a router 520 that acts as a secondary load balancer to the load balancer 510. That is, the router 520 may determine one or more computing resources 530 are currently processing to aggregate context data associated with the natural language input associated with the context data query 505. If none of the computing resources 530 are currently processing as such, the router 520 may let the load balancer 510's assignment stand. Conversely, if the router 520 determines one or more computing resources 530 are currently aggregating the requested context data, the router 520 may reassign the context data query 505 to those one or more computing resources 530. The foregoing decisions of the router 520 may be based on job statuses associated with processes performed by one or more computing resources 530. This prevents the computing resources 530 from duplicating queries to the same context data source(s) 560, for the same context data (e.g., thereby decreasing load on downstream context data sources). Moreover, as a result of such reassignment, the computing resources 530 are able to output context data, in response to multiple context data queries, even if processing for one context data query began prior to receipt of a second context data query requesting the same context data. As a result, context data may be provided to the source of the second context data query faster than if the computing resources 530 separately called one or more context data sources 560 in response to the second context data query.

The computing resources 530 may be associated with a preconfigured data framework of entities and relationships (or may have a plurality of preconfigured data frameworks). The data framework may be generated offline, and used by the computing resources 530 at runtime. For example, a data framework may represent a user device 110 is associated with a user 5. The user 5 may be associated with one or more endpoint devices. The user 5 may also be associated with a group that includes various users. A data framework may also include nodes representing substance of the natural language input.

The one or more computing resources 530 (either determined by the load balancer 510 or the router 520) may use an entity or natural language input parameter (represented in the context data query 505) as a starting point to traverse the data framework to determine different types of related entities. For example, if the context data query 505 requests data associated with a particular user identifier, the one or more computing resources 530 may determine one or more endpoint device identifiers associated with the user identifier, a group identifier associated with the user identifier, and/or one or more other user identifiers associated with the group identifier.

The one or more computing resources 530 may determine, for each entity, at least one context data source 560. The context data source(s) 560 may have access to various types of context data including, for example, data representing which users of the virtual assistant system 120 are subscribed to one or more pay-for services of the virtual assistant system 120, data representing IP addresses associated with user devices from which natural language inputs were received, data representing electronic calendar events, data representing types of music a particular user 5 has listened to over a previous amount of time (e.g., the last 30 days), data representing demographic information of users (e.g., birthdate, gender, education, etc. as represented in user profiles) etc. In general, the context data source(s) 560 may provide context data that may be used by various components of the virtual assistant system 120 in performing their respective processes. A context data source 560 may be a storage containing context data, or may be a computer processing component in communication with such a storage. While FIG. 4 illustrates the context data source(s) 560 being implemented by the virtual assistant system 120, one skilled in the art will appreciate that a portion or all of the context data source(s) 560 may not be implemented by, but may be in communication with, the virtual assistant system 120.

The one or more computing resources 530 may send a context data query 515 to each determined context data source 560. The context data query 515, sent to a particular context data source 560, may represent one or more entity identifiers for each of the one or more entity types determined while traversing the data framework. The identifiers may correspond to one or more device identifiers, one or more user identifiers, one or more natural language input identifiers, etc. The one or more computing resources 530 may receive context data 525 from each queried context data source 560.

The one or more computing resources 530 may also query context storage 540 for context data 535 prefetched with respect to the natural language input, user 5, and/or user device 110 (e.g., queried from context data sources 560 once the system determined the user identifier and/or user device identifier of the user 5 and/or user device 110, respectively, but prior to a component of the virtual assistant system 120 needing such context data to process). The one or more computing resources 530 may query context storage 540 with respect to the same identifier(s) that the one or more computing resources send to the context data source(s) 560.

The one or more computing resources 530 may store the context data (525/535) in context storage 550. The context data stored in context storage 550 may represent a source (e.g., a context data source 560) from which the context data was received, one or more identifiers of the one or more computing resources 530 used to obtain the context data, a type of the context data, etc.

The one or more computing resources 530 may also send the context data (525/535) to the component(s) of the virtual assistant system 120 that originated context data queries requesting the context data. In some examples, the one or more computing resources 530 may send the context data (525/535) to the orchestrator component 230, which may route the context data (525/535) to the virtual assistant system 120 component(s) that requested the context data. The context data (525/535) may be sent to the virtual assistant system 120 component that originated the context data query 505. The context data (525/535) may also be sent to one or more virtual assistant system 120 components that sent context data queries (requesting the same or similar context data as the context data query 505) after the context data query 505 was received, but prior to the context data (525/535) being received by the context aggregation component 265 (e.g., context data queries reassigned by the router 520).

The aggregation of context data, as described with respect to FIG. 5, may occur more than once with respect to a single natural language input. For example, the context aggregation component 265 may receive a first query for context data to be used to perform ASR processing with respect to a natural language input, a second query for context data to be used to perform NLU processing with respect to the natural language input, a third query for context data to be used to select a skill component 125 to be invoked with respect to the natural language input, a fourth query for context data to be used by the skill component 125 to perform an action responsive to the natural language input, etc. For further example, the context aggregation component 265 may receive a first query for context data to be used to perform NLU processing of a natural language input by a first NLU domain, a second query for context data to be used to perform NLU processing of the natural language input by a second NLU domain, etc.

In at least some examples, the context aggregation component 265 may associate received context data with a corresponding natural language input identifier for later recall. For example, when the context aggregation component 265 prefetches context data to be used for ASR processing, the context aggregation component 265 may associate the context data with a corresponding natural language input identifier in storage. Thereafter, if the ASR component 250 requests context data for the natural language input identifier, the context aggregation component 265 is able to recall the appropriate context data (e.g., the context data associated with the natural language input identifier) from storage. For further example, when the context aggregation component 265 prefetches context data to be used for NLU processing, the context aggregation component 265 may associate the context data with a corresponding natural language input identifier in storage. Thereafter, if the NLU component 260 requests context data for the natural language input identifier, the context aggregation component 265 is able to recall the appropriate context data from storage. Other examples are possible.

The context aggregation component 265 may receive queries for context data for different natural language inputs and for different stages of natural language input processing. The context aggregation component 265 may also receive published events, such as those representing a user has recently enabled a skill component 125. The context aggregation component 265 may obtain context data when the context aggregation component 265 anticipates context data may be used during processing of a natural language input. For example, in response to receiving a published event representing a user has recently enabled a skill component 125, the context aggregation component 265 may obtain context data that may be used by the skill component 125 to process a natural language input provided by the user.

The virtual assistant system 120 may include a dynamic routing component 275 configured to determine which NLU hypothesis most accurately represents the natural language input, as well as determine which skill component 125 to invoke in response to the natural language input. As described below, the dynamic routing component 275 may initially implement rule data corresponding to one or more rules associated with one or more skill components 125. Once the virtual assistant system 120 determines implementation of rule data, corresponding to a rule, results in a sufficient amount of beneficial user experiences, the dynamic routing component 275 may be reconfigured to implement the rule data as part of a machine learned model, and thereafter no longer separately implement the rule data.

Figure 6:
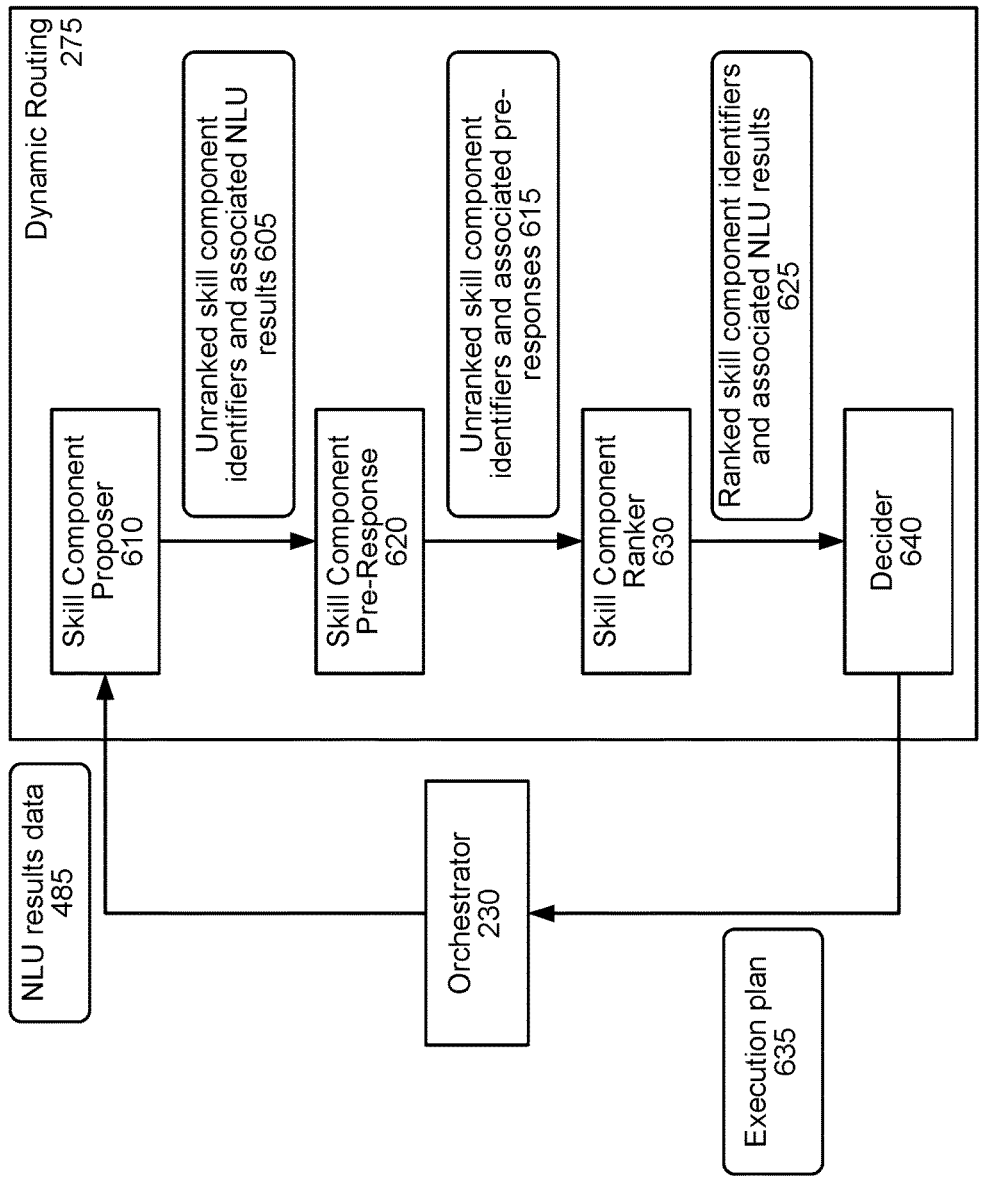
FIG. 6 is a conceptual diagram illustrating how dynamic selection of a skill component may be performed at runtime, according to embodiments of the present disclosure.
Figure 7:
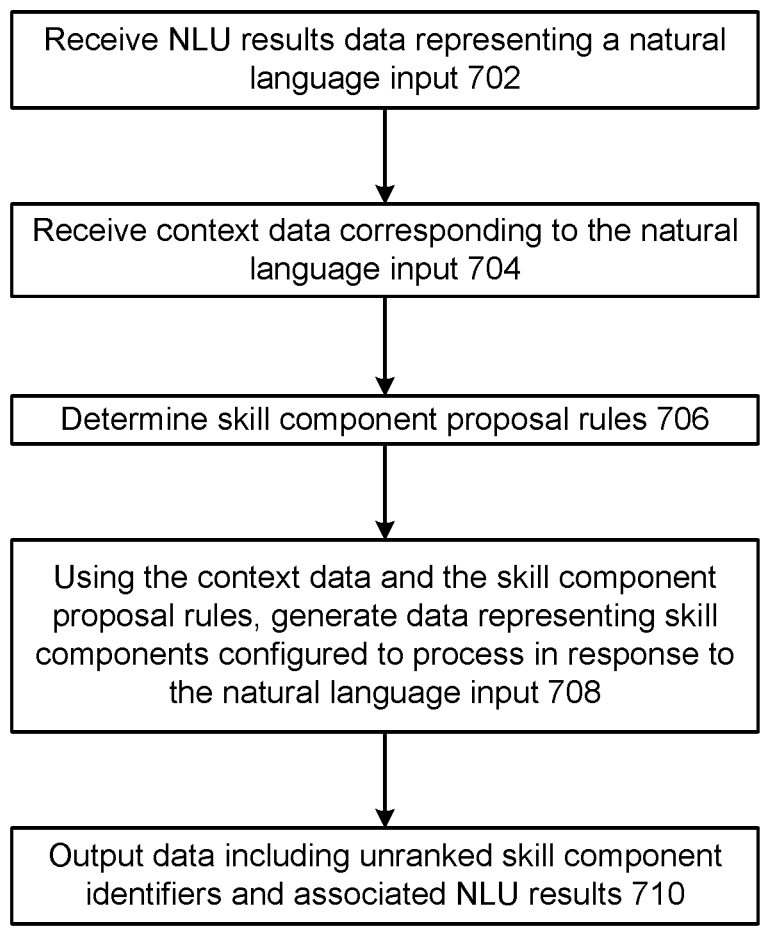
FIG. 7 is process flow diagram illustrating how a skill component proposer may determine skill components capable of processing in response to a natural language input, according to embodiments of the present disclosure.
Figure 8:
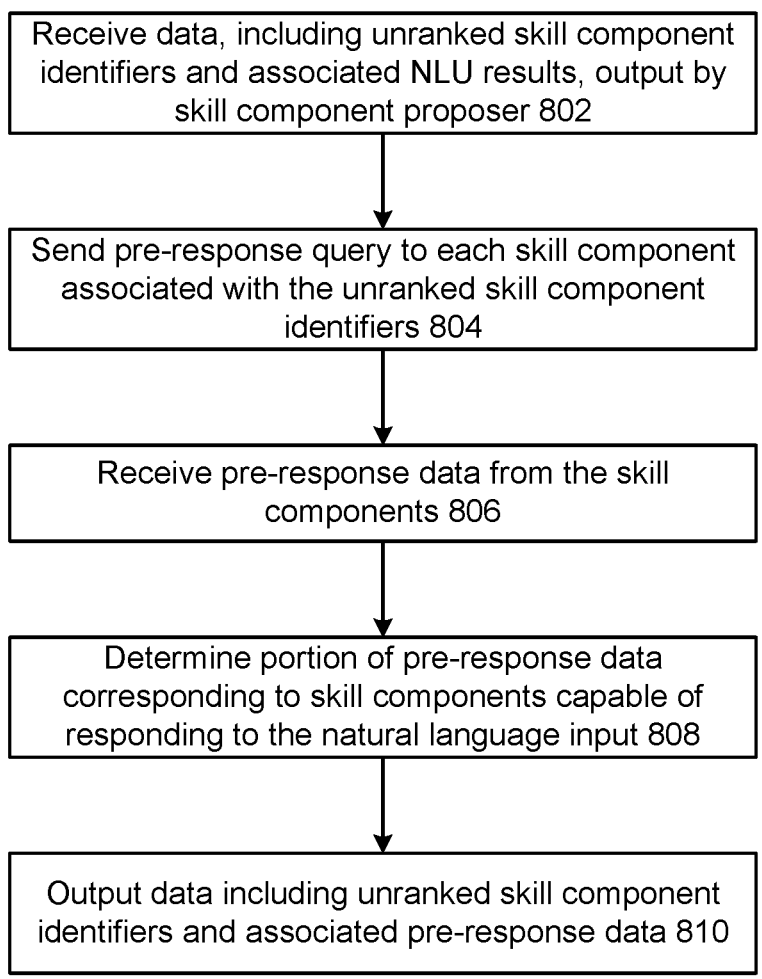
FIG. 8 is process flow diagram illustrating how a skill component pre-response component may determine pre-responses of skill components, according to embodiments of the present disclosure.

As illustrated in FIG. 6, the dynamic routing component 275 may include a skill component proposer 610 configured to determine skill components 125 capable of processing in response to the natural language input. Example processing of the skill component proposer 610 will be described below in reference to FIG. 7.

The skill component proposer 610 may receive (702) NLU results data 485 representing the natural language input. In at least some embodiments, the skill component proposer 610 may receive the NLU results data 485 from the orchestrator component 230 (as illustrated in FIG. 6).

The skill component proposer 610 may also receive (704) context data corresponding to the natural language input. For example, the context data may indicate (1) a skill component identifier of a skill component 125 that was causing the user device 110 to output content (e.g., music, video, synthesized speech, etc.) when the user device 110 captured the natural language input, (2) one or more skill component identifiers corresponding to one or more skill components 125 that are indicated as enabled in a profile (as stored in the profile storage 270) associated with the user 5 (as determined by the user recognition component 295), (3) output capabilities (which may be represented as a device type identifier) of a user device (which may or may not be the same user device as the user device 110 that captured the natural language input) to be used to output a response to the natural language input, (4) a geographic location of the user device 110 (e.g., as represented in a profile in the profile storage 270), (5) data indicating an operation mode of the user device to be used to output a response to the natural language input (e.g., data indicating whether the user device presently corresponds to a "do not disturb" status, whether the user device is enabled to be used for 1-way messaging functionality of the virtual assistant system 120, whether the user device is enabled to be used for 2-way communication functionality of the virtual assistant system 120, whether the user device is enabled to output announcement content, etc.), (6) ASR output data, (7) various user profile data, and/or other context data available to the virtual assistant system 120 and corresponding to the natural language input. In at least some embodiments, the skill component proposer 610 may receive the context data in response to the skill component proposer 610 causing a context data query 505 to be sent to the context aggregation component 265.

The skill component proposer 610 may determine (706) skill component proposal rules. A skill component developer 7 (via a skill component developer device 115) may provide the virtual assistant system 120 with rules data, corresponding to one or more rules, representing when the skill component developer 7's skill component 125 should be invoked. In at least some embodiments, such a rule may be specific to a NLU intent. In such embodiments, if a skill component 125 is configured to execute with respect to multiple skills, the skill component 125 may be associated with more than one rule (e.g., each rule corresponding to a different NLU intent capable of being handled by the skill component 125). In addition to being specific to an intent, a rule may also indicate one or more entities identifiable by a NER component 362 of the NLU component 260), one or more entity identifiers capable of being output by the entity resolution component 470 of the NLU component 260), and/or context to which a natural language input may correspond. For example, a rule may indicate context such as output capabilities of a user device, a geographic location, an operation mode of a user device (e.g., that a user device needs to be enabled to be used for 1-way messaging functionality of the virtual assistant system 120, that a user device needs to be enabled to be used for 2-way communication functionality of the virtual assistant system 120, that a user device needs to be enabled to output announcement content, etc.), and/or other context data. For each skill component, the virtual assistant system 120 may associate, in storage, the skill component 125's identifier with each rule corresponding to the skill component 125. As an example, the virtual assistant system 120 may store a rule indicating a video skill component may execute when a natural language input corresponds to a <PlayVideo> intent and the user device (to be used to output a response to the natural language input) includes (or is otherwise associated with) a display. As another example, the virtual assistant system 120 may store a rule indicating a music skill component may execute when a natural language input corresponds to a <PlayMusic> intent and music is being output by a user device when the user device captures a natural language input. It will be appreciated that other examples are possible. The foregoing rules enable skill components 125 to be differentially proposed at runtime (e.g., based on NLU entities, NLU entity resolution identifiers, and context data) in systems where multiple skill components 125 are configured to execute with respect to the same NLU intent.

The skill component proposer 610 may, using the received context data and the foregoing described skill component proposal rules, generate (708) data representing skill components 125 configured to process in response to the natural language input. Thus, in at least some embodiments, the skill component proposer 610 may be implemented as a rules engine. In at least some embodiments, the skill component proposer 610 may make binary (e.g., yes/no, true/false, etc.)

determinations regarding whether a skill component 125 is configured to process in response to the natural language input. For example, the skill component proposer 610 may determine a skill component 125 is configured to process, in response to the natural language input, if the skill component 125 is associated with a rule corresponding to the NLU results data 485 (e.g., corresponding to an intent (and optionally one or more entities and/or entity resolution identifiers) represented in the received NLU results data 485) and the received context data.

In at least some embodiments, the skill component proposer 610 may generate data representing such binary determinations made with respect to all skill components 125 implemented by (or otherwise in communication with) the virtual assistant system 120. In at least some embodiments, the skill component proposer 610 may generate data representing such binary determinations made with respect to only a portion of the skill components 125 implemented by (or otherwise in communication with) the virtual assistant system 120 (for example only skill components 125 indicated as enabled in the received context data).

The skill component proposer 610 may output (710) data 605 (illustrated in FIG. 6) including unranked skill component identifiers and associated NLU results. In other words, the data 605 may include skill component identifier associated with NLU results data, but not associated with confidence scores (or other scores) representing likelihoods that the skill components should be invoked to execute. For example, each skill component identifier, in the data 605, may be associated with a NLU hypothesis (represented in the NLU results data 485) to which the skill component proposer 610 determined the skill component 125's rule corresponds, but may not be associated with a confidence score (or other score) representing whether the skill component should be invoked to execute. The skill component proposer 610 may simply make binary determinations (as described above); as such, the skill component proposer 610 may not make any confidence determinations, and the skill component identifiers may be unranked in the data 605. An illustrative example of the data 605, that may be output by the skill component proposer 610, may be represented as:

Skill Component Identifier: 1ds532 Intent: <PlayMusic> AlbumName: GameOfThrones

Skill Component Identifier: jfd1k828 Intent: <PlayVideo> VideoTitle: GameOfThrones Skill Component Identifier: 434k1113 Intent: <PlayVideo> VideoTitle: GameOfThrones with the "Intent: <PlayMusic> Album Name: GameofThrones" and "Intent: <PlayVideo> VideoTitle: GameofThrones" portions of the data 605 corresponding to NLU results.

In at least some embodiments, the shortlister component 410 (of the NLU component 260) and the skill component proposer 610 may both be implemented by the virtual assistant system 120. In such instances, the shortlister component 410 and the skill component proposer 610 may process with respect to different skill components 125. For example, in at least some embodiments, the shortlister component 410 may process with respect to skill components 125 in communication with the virtual assistant system 120 (e.g., illustrated in FIG. 2 as being outside of the virtual assistant system 120), and the skill component proposer 610 may process with respect to skill components 125 implemented by the virtual assistant system 120 (e.g., illustrated in FIG. 2 as a component box within the virtual assistant system 120). In such embodiments, skill component identifiers output by the shortlister component 410 (and associated NLU results) may be merged with the skill component identifiers and associated NLU results (output by the skill component proposer 610), and the merged data may be input to a skill component pre-response component 620 of the dynamic routing component 275. Alternatively, the skill component identifiers and associated NLU results (output by the shortlister component 410, and the skill component identifiers and associated NLU results (output by the skill component proposer 610) may be separately sent to the skill component pre-response component 620.

The data 605, output by the skill component proposer 610, may be received (802) by a skill component pre-response component 620 of the dynamic routing component 275 (either directly or indirectly from the skill component proposer 610). The skill component pre-response component 620 may be configured to query skill components 125 for pre-responses. A pre-response may represent how a skill may process if invoked to respond to the natural language input, and may optionally include a variety of other data representing a strength of the skill component 125's response. In at least some embodiments, this other data may correspond to context data available to the skill component 125 but not the context aggregation component 265 (e.g., this context data may be stored in one or more storages in communication with the skill component 125 but not the context aggregation component 265). For example, a pre-response may indicate a skill can personalize a response using profile data accessible to the skill (and may indicate the types of profile data accessible); a pre-response may indicate a skill can respond but cannot personalize the response; a pre-response may indicating a user does not have a subscription with the skill, but that the skill can respond using free functionality of the skill; etc.

The skill component pre-response component 620 may send 804 a pre-response query to each skill component 125 associated with an unranked skill component identifier output by the skill component proposer 610. The skill component pre-response component 620 may determine, in the received data, a portion of NLU results associated with a particular skill component identifier. Thereafter, the skill component pre-response component 620 may send, to a skill component 125 corresponding to the skill component identifier, a pre-response query including the portion of the NLU results associated with the skill component 125's identifier.

A skill component 125 may determine, based on received NLU results and other data available to the skill component 125, whether the skill component 125 could respond to the natural language input. For example, a skill component 125 may generate a pre-response indicating the skill component 125 can respond to the natural language input, indicating the skill component 125 may be able to respond to the natural language input (e.g., the indicating the skill component 125 needs more data to determine whether the skill component 125 can respond to the natural language input), or indicating the skill component 125 cannot respond to the natural language input.

In situations where a skill component 125's pre-response indicates the skill component 125 can or may be able to respond to the natural language input, the pre-response may also include various other data representing a strength of the skill component 125's potential response to the natural language input. Such other data may correspond to data available to the skill component 125 but not the context aggregation component 265 of the virtual assistant system 120. Such other data may positively influence the skill component 125's runtime ranking as described herein below. For example, such other data may indicate capabilities (e.g., output capabilities or components such availability of a connected screen, loudspeaker, etc.) of a user device to be used to output the skill component 125's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 5 already has a profile and/or subscription with the skill component 125; that the user 5 does not have a subscription with the skill component 125, but that there is a free trial/tier the skill component 125 is offering; with respect to a taxi skill component 125, a cost of a trip based on start and end locations, how long the user 5 would have to wait to be picked up, etc.; and/or other data available to the skill component 125 that is related to the skill component 125's processing of the natural language input. In at least some embodiments, a skill component 125's pre-response may include a flag (or other indicator) representing a strength of the skill component 125's ability to personalize its response to the user 5.

In at least some embodiments, a skill component 125's pre-response may be configured to a schema pre-defined by the virtual assistant system 120. By the virtual assistant system 120 requiring pre-responses to conform to a specific schema (e.g., by requiring skill components 125 to only be able to provide certain types of data in pre-responses), the virtual assistant system 120 may onboard new skill components 125 into the dynamic routing functionality described herein without needing to reconfigure the dynamic routing component 275 each time a new skill component 125 is onboarded. Moreover, requiring pre-responses to conform to a schema limits the amount of values needed to be used to train and implement a machine learned model for ranking skill components 125 at runtime, as described herein below.

The skill component pre-response component 620 may receive (806) pre-response data from the queried skill components 125. The skill component pre-response component 620 may determine (808) a portion of the received pre-response data corresponding to skill components capable of responding to the natural language input. In other words, the skill component pre-response component 620 may determines a portion of received pre-responses indicating the associated skill component 125 can respond to the natural language input, or may be able to respond if the skill component 125 gets more data.

Thereafter, the skill component pre-response component 620 may output (810) data 615 including unranked skill component identifiers and associated pre-response data. This data 615 may not include skill component identifiers, and associated pre-responses, corresponding to skill components 125 that indicated they could not respond to the natural language input. Thus, a skill component 125's pre-response, which indicates the skill component 125 cannot respond to the natural language input, may effectively operate as a way for the skill component 125 to prevent itself from being invoked at runtime to respond to the natural language input.

The data 615, output by the skill component pre-response component 620, may be received (902) by a skill component ranker 630 of the dynamic routing component 275 (either directly or indirectly from the skill component pre-response component 620). In at least some embodiments, the skill component ranker 630 may be configured to rank skill components 125 using a machine learned model and skill component rule data (in conjunction with context data). In at least some embodiments, the machine learned model may be built on a deep neural network (DNN).

As described herein above, a skill component 125's rule data may indicate that the skill component 125 should be invoked to respond to a natural language input when the natural language input corresponds to specific context data. For example, a skill component's rule data may indicate the skill component should be invoked when a natural language input is captured by a user device of a certain type or having certain characteristics. For further example, a skill component's rule data may indicate the skill component should be invoked when a user device, that captured the natural language input, is in a particular state when the natural language input is captured. As another example, a skill component's rule data may indicate the skill component should be invoked when the natural language input is captured during a certain time of day. In yet another example, a skill component's rule data may indicate the skill component should be invoked when the user device, that captured the natural language input, is located in a particular geographic location. One benefit to implementing such rule data is that skill developers are able to decrease potential incidental bias in ranking purely using a machine learned model. In other words, implementation of the foregoing illustrative rule data enables a skill developer to potentially increase a skill component ranking when a natural language input corresponds to context data the skill developer thinks makes the skill component a strong candidate for responding to the natural language input. However, as described herein, the dynamic routing component 275 may still retain control over what skill is actually invoked at runtime.

Figure 9:
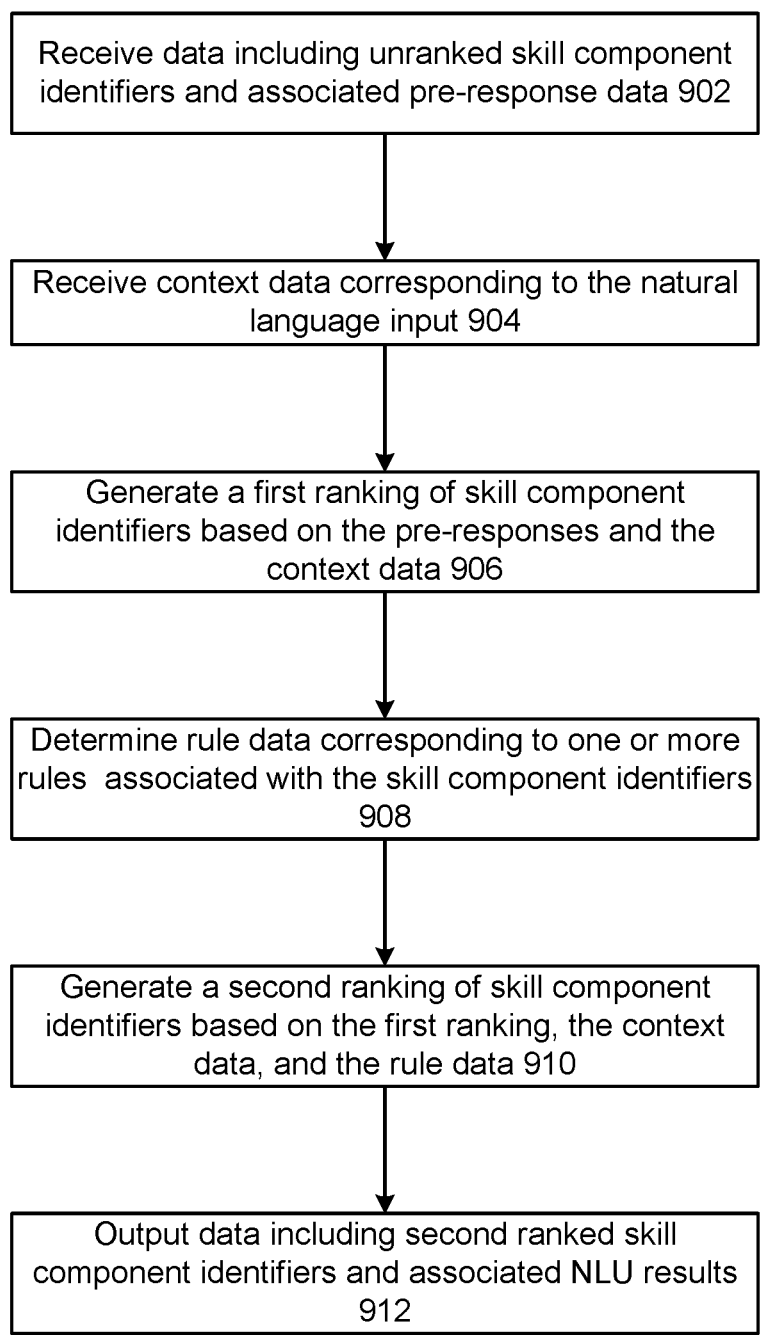
FIG. 9 is process flow diagram illustrating how a skill component ranker may rank skill components at runtime, according to embodiments of the present disclosure.

Referring to FIG. 9, at runtime the skill component ranker 630 may receive (902) the data 615 including unranked skill component identifiers and associated pre-response data. The skill component ranker 630 may also receive (904) context data corresponding to the natural language input. Such context data may indicate, for example, one or more preferences (e.g., skill component 125 preferences) of the user 5 (as represented in a user profile or group profile stored in the profile storage 270), one or more domains corresponding to the natural language input, one or more intents representing the natural language input, NER slot values as represented in the NLU results data 485 output by the NLU component 260, a measure of success of entity resolution performed with respect to the natural language input, text representing the natural language input, rankings of individual NLU results (e.g., individual NLU hypotheses) within the NLU results data 485, a type of the user device 110 that received the natural language input, a type of the user device 110 that is to be used to output a response to the natural language input, whether the user device 110 (that received the natural language input) was outputting audio when the natural language input was received, whether the user device 110 (that received the natural language input) was outputting video when the natural language input was received, and/or other context data available to the virtual assistant system 120. In at least some embodiments, the skill component ranker 630 may receive the context data by causing a context data query 505 to be input to the context aggregation component 265 of the virtual assistant system 120.

The skill component ranker 630 may generate (906) a first ranking of skill component identifiers (represented in the data 615) based on the pre-responses and the context data. Things that may increase a skill component identifier's ranking include, for example, that the skill component identifier is associated with a pre-response indicating a corresponding skill component 125 can generate a response (to the natural language input) that is personalized to the user 5, that a NLU hypothesis corresponding to the skill component identifier is ranked highly in the NLU hypotheses output by the NLU component, that the skill component identifier corresponds to a music skill component and the user device 110 was outputting music when the natural language input was received, that the skill component identifier corresponds to a video skill component and the user device 110 was outputting video when the natural language input was received, etc. Things that may decrease a skill component identifier's ranking include, for example, that the skill component identifier is associated with a pre-response indicating a corresponding skill component 125 cannot generate a response (to the natural language input) that is personalized to the user 5, that a NLU hypothesis corresponding to the skill component identifier is ranked low in the NLU hypotheses output by the NLU component, that the skill component identifier corresponds to a video skill component and the user device 110 was outputting music when the natural language input was received, that the skill component identifier corresponds to a music skill component and the user device 110 was outputting video when the natural language input was received, etc. Other examples are possible and will depend on the context data available to the skill component ranker 630.

In at least some embodiments, the skill component ranker 630 may generate the first ranking of skill component identifiers using a machine learned model. In at least some embodiments, the machine learned model may be built on a DNN. For example, the skill component ranker 630 may input, to the machine learned model, the pre-responses and the context data, and may receive (as output from the machine learned model) the first ranking of skill component identifiers.

The skill component ranker 630 may determine (908) rule data corresponding to one or more rules associated with the skill component identifiers represented in the received data 615. The skill component ranker 630 may generate (910) a second ranking of skill component identifiers based on the first ranking, the context data, and the rule data. For example, each of the skill component identifiers may be associated with rule data corresponding to one or more rules, if the skill component ranker 630 determines rule data corresponds to the context data, the skill component ranker 630 may increase a ranking of the skill component identifier (associated with the rule data) within the first ranking. In at least some embodiments, if the skill component ranker 630 determines rule data corresponds to the context data, the skill component ranker 630 may make the skill component identifier (associated with the rule data) a top-ranked skill component identifier in the second ranking. However, in at least some embodiments, the skill component ranker 630 may not decrease a skill component identifier's ranking simply because rule data (associated with the skill component identifier) does not correspond to the context data. In at least some embodiments, the skill component ranker 630 may not generate the second ranking based simply on rule data associated with the skill component identifiers represented in the received data 615, but instead may generate the second ranking based on all rule data accessible to the skill component ranker 630.

In at least some embodiments, rule data may be written in YAML Ain't Markup Language (YAML), which is a human-readable data-serialization language. In at least some embodiments, the skill component ranker 630 may implement a rule-based java library to match rule data to context data.

For example, in at least some embodiments the skill component ranker 630 may only implement rule data at runtime when performance of a machine learned model (implemented by the skill component ranker 630) is unsatisfactory [e.g., the machine learned model outputs a confidence value failing to satisfy a condition (e.g., a threshold confidence value)].

The skill component ranker 630 may output (912) data 625 including the second ranked skill component identifiers and their associated NLU results (e.g., NLU hypotheses). In at least some embodiments, the skill component ranker 630's processing may affect scores (e.g., confidence scores) associated with the skill component identifiers, but not affect scores (e.g., confidence scores) generated by the NLU component 260 for the NLU results. An illustrative example of the data 625, that may be output by the skill component ranker 630, may be represented as:

[0.85] Skill Component Identifier: 12dfrads532 Intent: <PlayMusic> AlbumName: GameOfThrones

[0.62] Skill Component Identifier: jfd1k828 Intent: <PlayVideo> VideoTitle: GameOfThrones

[0.55] Skill Component Identifier: 434k1113 Intent: <PlayVideo> VideoTitle: GameOfThrones with the "Intent: <PlayMusic> Album Name: GameofThrones" and "Intent: <PlayVideo> VideoTitle: GameofThrones" portions of the data 625 corresponding to NLU results.

In at least some embodiments, the skill component ranker 630 may determine the first ranked list, using a machine learned model prior to determining the second ranked list using rule data and context data. Alternatively, the skill component ranker 630 may determine the first ranked list at least partially in parallel to determining the second ranked list. When the skill component ranker 630 determines the first ranked list at least partially in parallel to determining the second ranked list, the second ranked list may be configured to supersede the first ranked list. In other words, if the skill component ranker 630 determines rule data (corresponding to a first skill component) corresponds to context data (corresponding to a present natural language input, the skill component ranker 630 may cause the first skill component to be the highest ranked skill component in a ranked list output by the skill component ranker 630.

A decider component 640 (of the dynamic routing component 275) may receive the data 625 from the skill component ranker 630 (either directly or indirectly). The decider component 640 is configured to generate an execution plan 635 based on the data 625 representing the ranked skill component identifiers and associated NLU results. For example, an execution plan 635 may include the top ranked skill component identifier and associated NLU result (represented in the data 625), along with an instruction to invoke the skill component 125 (corresponding to the top-ranked skill component identifier) to respond to the natural language input. In response to receiving such an execution plan 635, the orchestrator component 230 may invoke the skill component 125 (corresponding to the top-ranked skill component identifier) by sending the NLU result to the skill component 125 along with an instruction to generate a response. For further example, an execution plan 635 may indicate further data is needed from the user 5 in order for the dynamic routing component 275 to adequately determine which skill component 125 should be invoked. In response to receiving such an execution plan 635, the orchestrator component 230 may engage the user 5 to gather the further needed data (e.g., by causing the user device 110 to output synthesized speech and/or visual content requesting the further data, and the user device 110 capturing further natural language inputs corresponding to the further needed data). It will be appreciated that the foregoing are merely illustrative execution plans 635 and subsequent processing, and that the decider 640 may output other execution plans 635 causing other processing without departing from the present disclosure.

In at least some embodiments, the skill component ranker 630 may not be configured to perpetually implement rule data. In at least some embodiments, the skill component ranker 630 may be configured to roll user experience-enhancing rule data into the skill component ranker 630's machine learned model, while simply deleting user experience-harming rule data.

Figure 10:
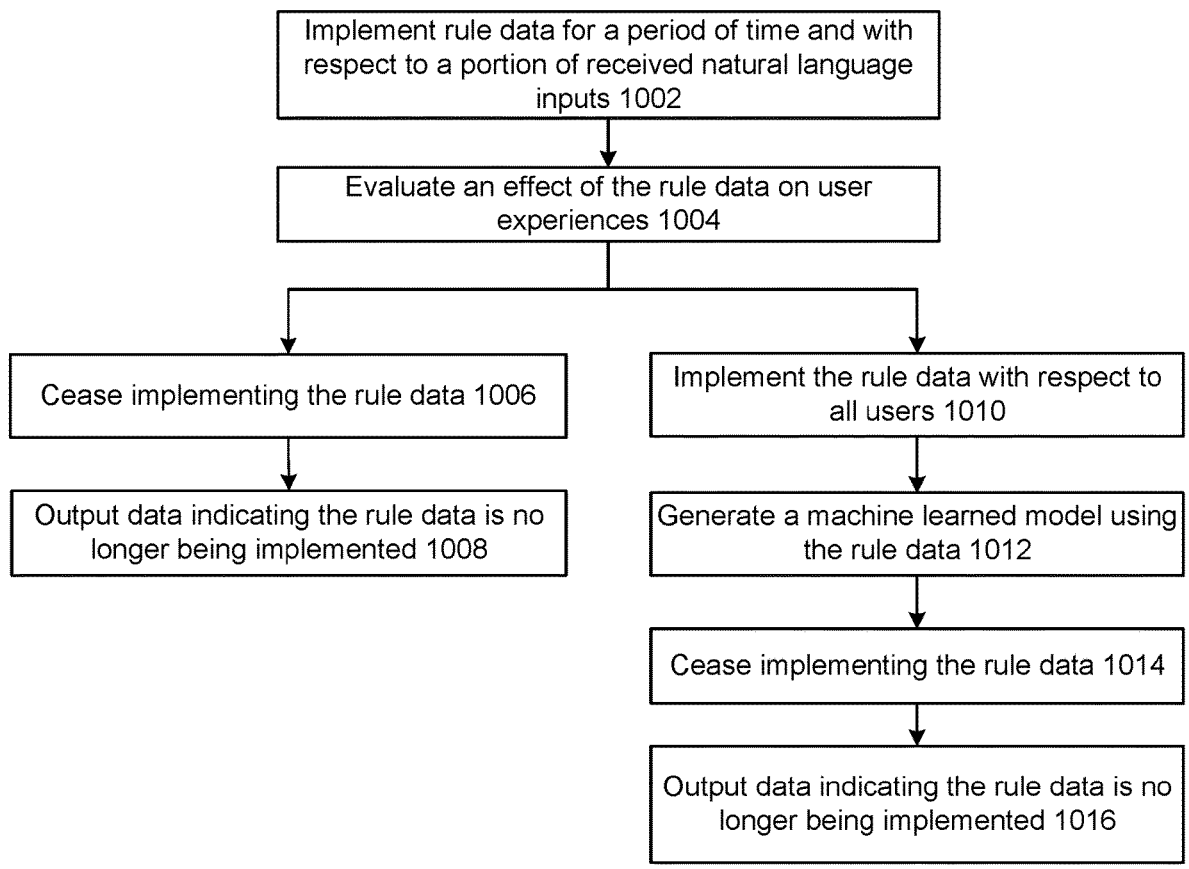
FIG. 10 is process flow diagram illustrating how a system may generate a machine learned model to incorporate skill component rule functionality, according to embodiments of the present disclosure.

With reference to FIG. 10, the virtual assistant system 120 may implement (1002) rule data for a period of time and with respect to a portion of natural language inputs received by the virtual assistant system 120. The period of time may correspond to an hour, a day, a week, a month, or some other non-perpetual period of time. The portion of the natural language inputs may be received from various users have profiles stored in the profile storage 270. In at least some embodiments, the portion of the natural language inputs may be received from user devices 110 corresponding to one or more particular geographic locations (e.g., one or more particular countries). In at least some embodiments, the portion of the natural language inputs may correspond to a specific percentage (e.g., 10%) of the natural language inputs received by the virtual assistant system 120; or may, more particularly, correspond to a specific percentage of natural language inputs received from user devices 110 corresponding to one or more specific geographic locations.

After the period of time has elapsed, the virtual assistant system 120 may evaluate (1004) an effect of the rule data on user experiences. In other words, the virtual assistant system 120 may determine whether implementation of the rule data (causing a specific skill component 125 to be invoked) resulted in positive experiences from the user perspective, or whether implementation of the rule data resulted in negative experiences from the user perspective. The virtual assistant system 120 may evaluate such using various techniques.

In at least some embodiments, the virtual assistant system 120 may perform AB testing (using known techniques) in which the virtual assistant system 120 measures user satisfaction with respect to a first group (with respect to which the rule data is implemented) and a second group (with respect to which the rule data is not implemented). As part of AB testing (or other testing), the virtual assistant system 120 may query users for feedback indicating whether invocation of a skill component 125, based on the rule data, was positive. Such virtual assistant system queries may take various forms (e.g., as synthesized speech and/or displayed content). Likewise, user feedback, provided in response to such queries, may take various forms (e.g., as spoken natural language inputs, as non-spoken natural language inputs, as selections of buttons presented on displays, etc.).

The virtual assistant system 120 may determine implementation of rule data was beneficial if implementation of the rule data satisfies a condition (e.g., implementation of the rule data resulted in at least a threshold percentage of users providing feedback indicating their user experiences were beneficial; implementation of the rule data resulted in at least a threshold percentage of natural language inputs corresponding to beneficial user feedback; implementation of the rule data resulted in users providing feedback whose average satisfies a condition (e.g., meets or exceeds a threshold feedback score); etc.). Likewise, the virtual assistant system 120 may determine implementation of rule data was not beneficial if implementation of the rule data does not satisfy a condition (e.g., implementation of the rule data resulted in less than a threshold percentage of users providing feedback indicating their user experiences were beneficial; implementation of the rule data resulted in less than a threshold percentage of natural language inputs corresponding to beneficial user feedback; implementation of the rule data resulted in users providing feedback whose average fails to satisfy a condition (e.g., fails to meet or exceed a threshold feedback score); etc.).

If the virtual assistant system 120 determines implementation of the rule data did not result in beneficial user experiences, the virtual assistant system 120 may cease (1006) implementing the rule data. In at least some embodiments, the virtual assistant system 120 may cease implementation of the rule data by associating the rule data with a flag (or other indicator) that deprecates the rule data (i.e., the flag indicates the rule data should no longer being used to generate a ranked list. In at least some embodiments, after the rule data is deprecated, the virtual assistant system 120 may nonetheless still track how often the rule data corresponds to context data of a natural language input.

The virtual assistant system 120 may also output (1008) data indicating the rule data is no longer being implemented. For example, the virtual assistant system 120 may send such data to a skill developer device 115 associated with the skill component 125 associated with the rule data. The data may indicate that the rule data is no longer being implemented because the rule data did not result in beneficial user experiences. In response, the skill developer 7 may adjust the rule data to be specific to different context data, and the virtual assistant system 120 may implement the adjusted rule data as described herein.

In at least some embodiments, if the virtual assistant system 120 determines implementation of the rule data resulted in mainly unbeneficial user experiences (e.g., resulted in the receipt of mainly negative feedback data), the virtual assistant system 120 may use the natural language inputs and associated context data, corresponding to the negative feedback data, as negative training data for purposes of training a machine learned model implemented by the skill component ranker 630. Such may result in a machine learned model that discourages selection of a skill component (corresponding to the rule data) when a future natural language input (and its context data) corresponds to the negative training data.

Conversely, if the virtual assistant system 120 determines implementation of the rule data resulted in beneficial user experiences, the virtual assistant system 120 may implement (1010) the rule data with respect to all users of the virtual assistant system 120. Eventually, the virtual assistant system 120 may use the rule data to generate (1012) a machine learned model for implementation by the skill component ranker 630 at runtime. In other words, the virtual assistant system 120 may generate a machine learned model including functionality corresponding to the rule data.

In at least some embodiments, the virtual assistant system 120 may generate the machine learned model using positive and negative training data. For example, the virtual assistant system 120 may determine at least one instance when selection of a first skill component (based on the rule data) resulted in positive feedback data, and may also determine at least one instance when selection of the skill component (based on the rule data) resulted in negative feedback data. Moreover, the virtual assistant system 120 may determine context data corresponding to the natural language inputs corresponding to the positive and negative feedback data. The virtual assistant system 120 may use the natural language input and associated context data, corresponding to the positive feedback data, as positive training data for purposes of training the machine learned model. Moreover, the virtual assistant system 120 may use the natural language input and associated context data, corresponding to the negative feedback data, as negative training data for purposes of training the machine learned model. Such may produce a machine learned model that promotes selection of the skill component when a future natural language input corresponds to the positive training data, and discourages selection of the skill component when a future natural language input corresponds to the negative training data.

Various machine learning techniques may be used to train and operate a machine learned model implemented by the skill component ranker 630. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, the skill component ranker 630, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Once the virtual assistant system 120 generates the machine learned model, the virtual assistant system 120 may cease (1014) implementing the rule data (as the skill component ranker 630 will thereafter implement the rule data functionality through use of the machine learned model). In at least some embodiments, the virtual assistant system 120 may cease implementation of the rule data by associating the rule data with a flag (or other indicator) that deprecates the rule data (i.e., the flag indicates the rule data should no longer being used to generate a ranked list. In at least some embodiments, after the rule data is deprecated, the virtual assistant system 120 may nonetheless still track how often the rule data corresponds to context data of a natural language input.

In at least some embodiments, the virtual assistant system 120 may output (1016) data indicating the rule data is no longer being implemented. For example, the virtual assistant system 120 may send such data to a skill developer device 115 associated with the skill component 125 associated with the rule data. The data may indicate that the rule data is no longer being implemented because the rule data is implemented as part of a machine learned model implemented by the skill component ranker 630.

It will be appreciated that, while the present disclosure describes processing performable by a virtual assistant system 120 to select which skill component to invoke based on context data, the present disclosure is not limited thereto. In at least some instances, a user device 110 may be configured to implement some or all of the functionality described herein with respect to the virtual assistant system 120. For example, a smart phone may be configured to use context data to select a best on-phone application to run in response to a natural language input. More specifically, speech processing of a spoken input, context data aggregation, and application selection (corresponding to the herein described skill component selection processing) may all be performed by the smart phone without cloud or other non-smart phone system assistance. Such may limit the amount of data sharing with backend systems, thereby increasing user privacy.

Figure 11:
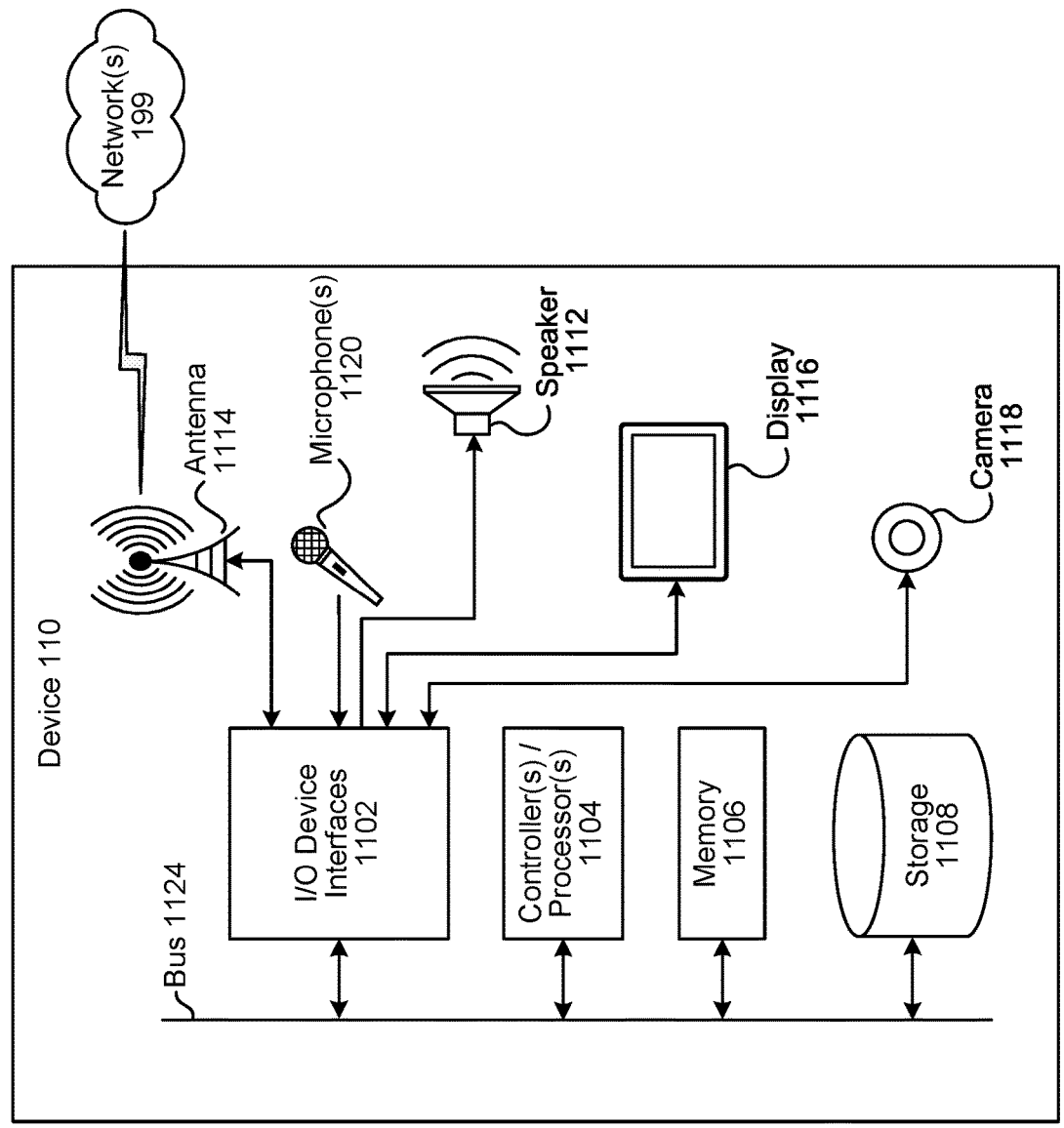
FIG. 11 is a block diagram conceptually illustrating example components of a device, according to embodiments of the present disclosure.
Figure 12:
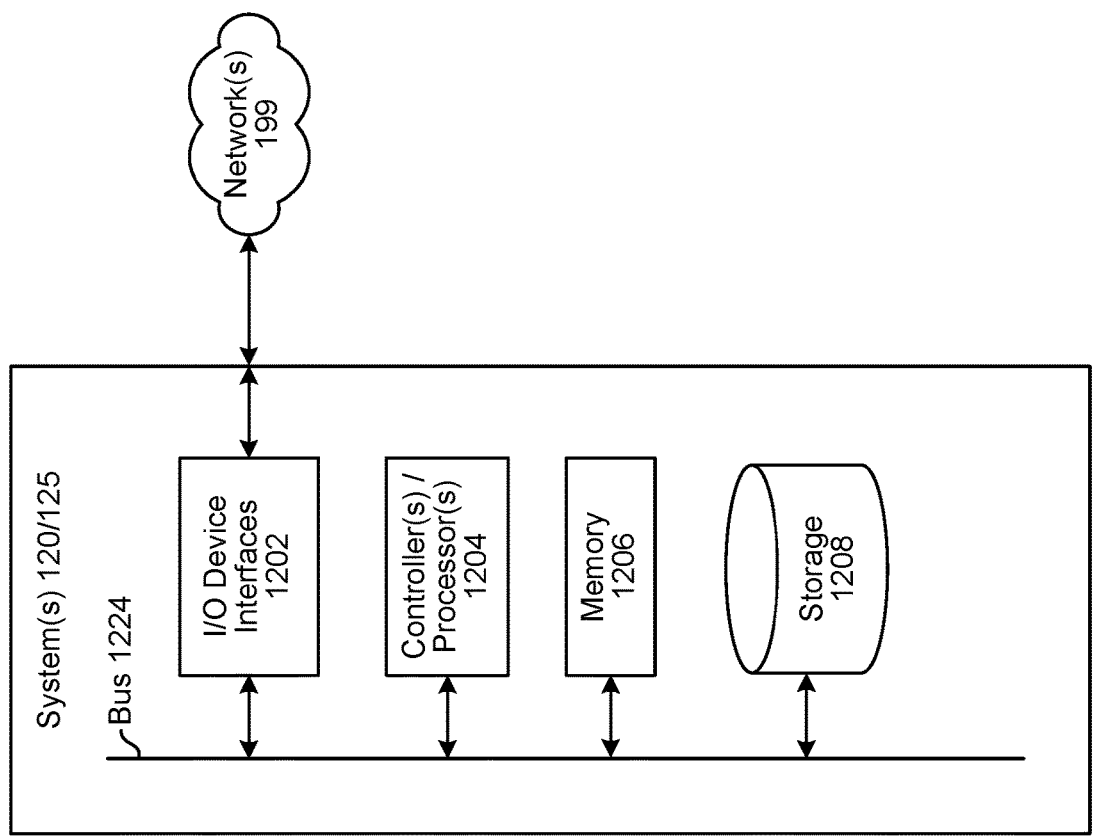
FIG. 12 is a block diagram conceptually illustrating example components of a system, according to embodiments of the present disclosure.

FIG. 11 is a block diagram conceptually illustrating a device 110 that may be used with the virtual assistant system 120. FIG. 12 is a block diagram conceptually illustrating example components of a remote device, such as the virtual assistant system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The virtual assistant system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more virtual assistant systems 120 for performing ASR processing, one or more virtual assistant systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the virtual assistant system 120, and/or a skill component 125 may include their own dedicated processors, memory, and/or storage. Alternatively, one or more of the components of the device 110, the virtual assistant system 120, and/or a skill component 125 may utilize the I/O interfaces (1102/1202), processor(s) (1104/1204), memory (1106/1206), and/or storage (1108/1208) of the device(s) 110, system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the virtual assistant system 120, and a skill component 125, as described herein, are illustrative, and may be located as a stand-alone device or may be included, in whole or in part, as a component of a larger device or system.

Figure 13:
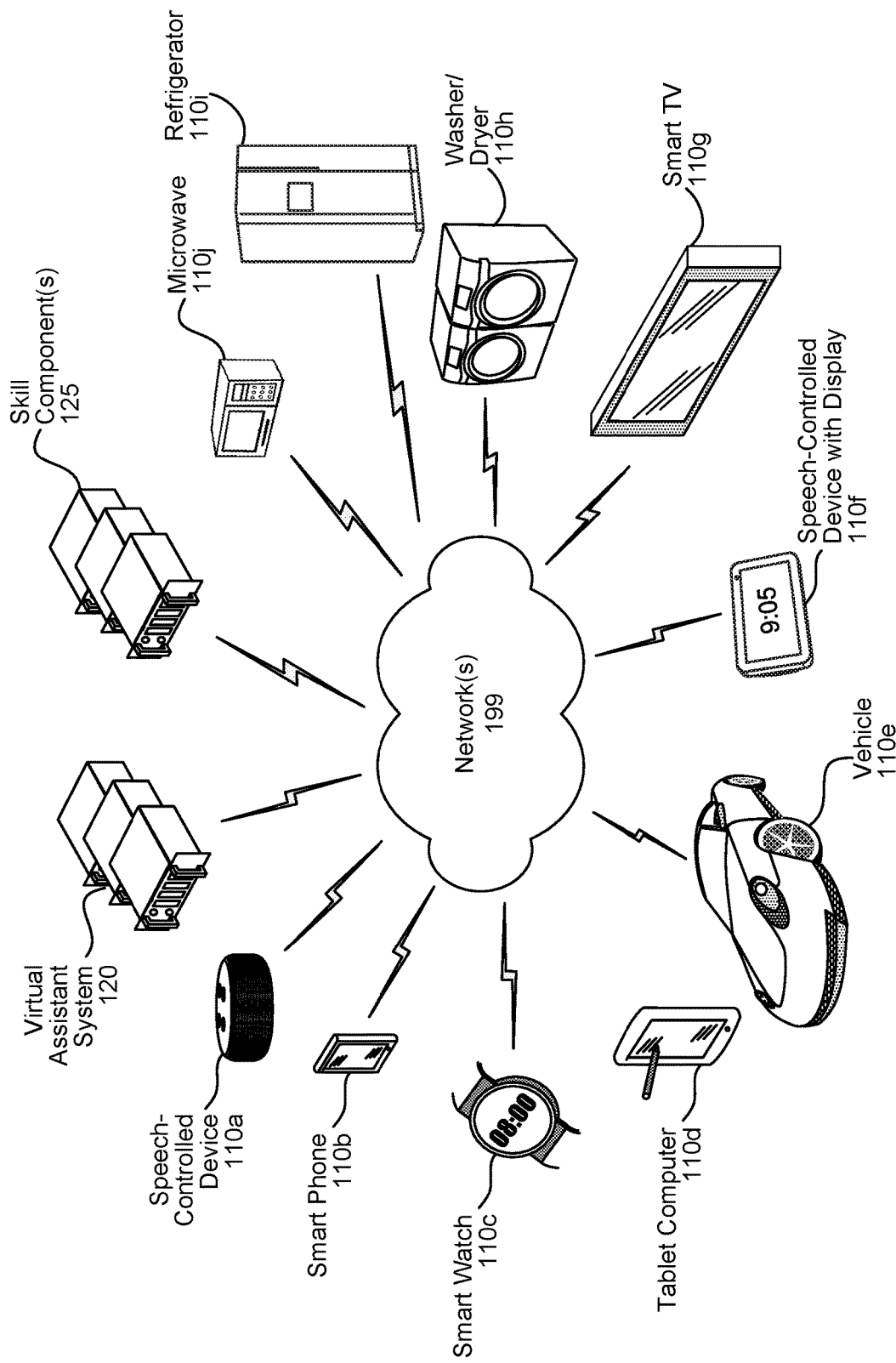
FIG. 13 illustrates an example of a computer network for use with the overall system, according to embodiments of the present disclosure.

As illustrated in FIG. 13, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the virtual assistant system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the virtual assistant system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device, first data indicating a first context in which a first component is to be used to process a spoken input, the first component being configured to process natural language understanding (NLU) results data;
   generating first rule data based at least in part on the first data;
   after generating the first rule data, receiving, from a second device, first audio data corresponding to a first spoken input;
   generating first NLU results data representing the first spoken input;
   using a first machine learned model, generating a first ranked list representing a first plurality of components configured to process the first NLU results data, the first plurality of components comprising the first component;
   receiving first context data corresponding to the first spoken input;
   after generating the first ranked list, determining the first rule data corresponds to the first context data;
   generating a second ranked list representing the first plurality of components, the first component being a highest ranked component in the second ranked list based on the first rule data corresponding to the first context data; and
   based on the first component being a highest ranked component in the second ranked list, causing the first component to process the first NLU results data.

2. The computer-implemented method of claim 1, further comprising:
   based at least in part on the first rule data, causing the first component to process second NLU results data representing a second spoken input associated with a first user identifier;
   based at least in part on the first rule data, causing the first component to process third NLU results data representing a third spoken input associated with a second user identifier;
   receiving positive user feedback data corresponding to the second spoken input;
   receiving negative user feedback data corresponding to the third spoken input;
   generating a second machine learned model configured to implement functionality corresponding to the first rule data, wherein generating the second machine learned model comprises:
      using the positive user feedback data as positive training data, and
      using the negative user feedback data as negative training data; and
   after generating the second machine learned model, associating the first rule data with an indicator representing the first rule data is to no longer be used to generate a ranked list.

3. The computer-implemented method of claim 2, further comprising:
   prior to generating the second machine learned model, causing the first component to process NLU results data representing a first plurality of spoken inputs corresponding to a first plurality of user identifiers; and
   prior to generating the second machine learned model but after receiving the positive user feedback data, causing the first component to process NLU results data representing a second plurality of spoken inputs corresponding to a second plurality of user identifiers, the second plurality of user identifiers being greater than the first plurality of user identifiers.

4. The computer-implemented method of claim 1, further comprising:
   based at least in part on the first rule data, causing the first component to process second NLU results data representing a second spoken input associated with a first user identifier;
   receiving, from a third device associated with the first user identifier, first negative user feedback data;
   based at least in part on the first negative user feedback data, associating the first rule data with an indicator representing the first rule data is to no longer be used to generate a ranked list;
   based at least in part on associating the first rule data with the indicator, sending, to the first device, second data indicating the first rule data resulted in the first negative user feedback data; and
   after sending the second data, receiving, from the first device, third data indicating the first component is to be caused to process in response to a spoken input corresponding to a second context.

5. A computer-implemented method comprising:
receiving, from a first device, first data indicating a first context in which a first component is to be used to process a natural language input, the first component being configured to process natural language understanding (NLU) results data;
receiving, from a second device, second data corresponding to a first natural language input;
generating first NLU results data representing the first natural language input;
determining a first plurality of components configured to process the first NLU results data, the first plurality of components comprising the first component;
receiving first context data corresponding to the first natural language input;
determining the first data corresponds to the first context data; and
based on the first data corresponding to the first context data, causing the first component to process the first NLU results data.

6. The computer-implemented method of claim 5, further comprising:
based at least in part on the first data, causing the first component to process second NLU results data representing a second natural language input;
receiving positive user feedback data associated with the second natural language input;
based at least in part on the positive user feedback data, generating a machine learned model configured to implement functionality corresponding to the first data; and
after generating the machine learned model, ceasing implementation of the first data.

7. The computer-implemented method of claim 6, further comprising:
prior to generating the machine learned model, causing the first component to process NLU results data representing a first plurality of natural language inputs corresponding to a first plurality of user identifiers; and
prior to generating the machine learned model and after receiving the positive user feedback data, causing the first component to process NLU results data representing a second plurality of natural language inputs corresponding to a second plurality of user identifiers, the second plurality of user identifiers being greater than the first plurality of user identifiers.

8. The computer-implemented method of claim 5, further comprising:
based at least in part on the first data, causing the first component to process second NLU results data representing a second natural language input;
receiving negative user feedback data associated with the second natural language input;
based at least in part on the negative user feedback data, ceasing implementation of the first data;
sending, to the first device, third data indicating the first data is associated with the negative user feedback data; and
after sending the third data, receiving, from the first device, fourth data indicating a second context in which the first component is to be used to process a natural language input.

9. The computer-implemented method of claim 5, wherein the first plurality of components comprises a second component, and wherein the computer-implemented method further comprises:
sending, to the second component, a request to indicate whether the second component is able to perform an action responsive to the first NLU results data; and
receiving, from the second component, third data indicating the second component is unable to perform an action responsive to the first NLU results data.

10. The computer-implemented method of claim 5, further comprising:
determining user profile data corresponding to the first natural language input, the user profile data representing a second component authorized to process with respect to natural language inputs; and
determining the first plurality of components to comprise the second component.

11. The computer-implemented method of claim 5, wherein the first plurality of components comprises a second component, and wherein the computer-implemented method further comprises:
receiving, from the second component, third data indicating the second component has access to user profile data corresponding to the first natural language input,
wherein a position of the second component, in the first plurality of components, is determined based at least in part on the third data.

12. The computer-implemented method of claim 5, wherein:
the second device generates the first NLU results data;
the first plurality of components corresponds to a first plurality of applications executed by the second device; and
the first component corresponds to a first application executed by the second device.

13. A computing system comprising:
at least one processor; and
at least one memory comprising instructions that, when executed by the at least one processor, cause the computing system to:
receive, from a first device, first data indicating a first context in which a first component is to be used to process a natural language input, the first component being configured to process natural language understanding (NLU) results data;
receive, from a second device, second data corresponding to a first natural language input;
generate first NLU results data representing the first natural language input;
determine a first plurality of components configured to process the first NLU results data, the first plurality of components comprising the first component;
receive first context data corresponding to the first natural language input;
determine the first data corresponds to the first context data; and
based on the first data corresponding to the first context data, cause the first component to process the first NLU results data.

14. The computing system of claim 13, wherein the at least one memory further comprises instructions that, when executed by the at least one processor, further cause the computing system to:
based at least in part on the first data, cause the first component to process second NLU results data representing a second natural language input;

receive positive user feedback data associated with the second natural language input;

based at least in part on the positive user feedback data, generate a machine learned model configured to implement functionality corresponding to the first data; and after generating the machine learned model, cease implementation of the first data.

15. The computing system of claim 14, wherein the at least one memory further comprises instructions that, when executed by the at least one processor, further cause the computing system to:

prior to generating the machine learned model, cause the first component to process NLU results data representing a first plurality of natural language inputs corresponding to a first plurality of user identifiers; and prior to generating the machine learned model and after receiving the positive user feedback data, causing the first component to process NLU results data representing a second plurality of natural language inputs corresponding to a second plurality of user identifiers, the second plurality of user identifiers being greater than the first plurality of user identifiers.

16. The computing system of claim 13, wherein the at least one memory further comprises instructions that, when executed by the at least one processor, further cause the computing system to:

based at least in part on the first data, cause the first component to process second NLU results data representing a second natural language input;

receive negative user feedback data associated with the second natural language input;

based at least in part on the negative user feedback data, cease implementation of the first data;

send, to the first device, third data indicating the first data is associated with the negative user feedback data; and after sending the third data, receive, from the first device, fourth data indicating a second context in which the first component is to be used to process a natural language input.

17. The computing system of claim 13, wherein the first plurality of components comprises a second component, and wherein the at least one memory further comprises instructions that, when executed by the at least one processor, further cause the computing system to:

send, to the second component, a request to indicate whether the second component is able to perform an action responsive to the first NLU results data; and receive, from the second component, third data indicating the second component is unable to perform an action responsive to the first NLU results data.

18. The computing system of claim 17, wherein the at least one memory further comprises instructions that, when executed by the at least one processor, further cause the computing system to:

determine user profile data corresponding to the first natural language input, the user profile data representing a second component authorized to process with respect to natural language inputs; and determine the first plurality of components to comprise the second component.

19. The computing system of claim 13, wherein the first plurality of components comprises a second component, and wherein the at least one memory further comprises instructions that, when executed by the at least one processor, further cause the computing system to:

receive, from the second component, third data indicating the second component has access to user profile data corresponding to the first natural language input, wherein a position of the second component, in the first plurality of components, is determined based at least in part on the third data.

20. The computing system of claim 13, wherein:

the second device generates the first NLU results data;

the first plurality of components corresponds to a first plurality of applications executed by the second device; and the first component corresponds to a first application executed by the second device.

* * * * *